(12) United States Patent
Jin et al.

(10) Patent No.: US 12,602,085 B2
(45) Date of Patent: Apr. 14, 2026

(54) DISPLAY DEVICE

(71) Applicant: Samsung Display Co., Ltd., Yongin-si (KR)

(72) Inventors: Byoung Jin Jin, Yongin-si (KR); Joon-Ik Lee, Yongin-si (KR); Mansoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 348 days.

(21) Appl. No.: 18/327,201

(22) Filed: Jun. 1, 2023

(65) Prior Publication Data

US 2024/0103581 A1 Mar. 28, 2024

(30) Foreign Application Priority Data

Sep. 28, 2022 (KR) ........................ 10-2022-0123790

(51) Int. Cl.
*G06F 1/16* (2006.01)
*H04M 1/02* (2006.01)

(52) U.S. Cl.
CPC .......... *G06F 1/1656* (2013.01); *G06F 1/1624* (2013.01); *H04M 1/0237* (2013.01)

(58) Field of Classification Search
CPC .... G06F 1/1656; G06F 1/1624; G06F 1/1637; G06F 1/1652; H04M 1/0237; H04M 1/0268; H05K 5/0217
See application file for complete search history.

(56) References Cited

U.S. PATENT DOCUMENTS

| | | | |
|---|---|---|---|
| 8,199,471 B2 | 6/2012 | Bemelmans et al. | |
| 9,678,539 B2* | 6/2017 | Hayk | G06F 1/1626 |
| 11,165,897 B2 | 11/2021 | Song et al. | |
| 2013/0058063 A1* | 3/2013 | O'Brien | G06F 1/1624 |
| | | | 361/807 |
| 2020/0253069 A1* | 8/2020 | Cha | G06F 1/1616 |
| 2020/0267247 A1 | 8/2020 | Song et al. | |
| 2020/0314225 A1* | 10/2020 | Ahn | G06F 1/1652 |
| 2020/0348727 A1* | 11/2020 | Lee | G09F 9/301 |
| 2021/0278878 A1* | 9/2021 | Shim | G06F 1/1656 |
| 2022/0019260 A1* | 1/2022 | Kang | G06F 1/1698 |
| 2022/0121240 A1 | 4/2022 | Jang et al. | |
| 2022/0167512 A1* | 5/2022 | Ahn | G06F 1/1624 |
| 2023/0209745 A1* | 6/2023 | Yen | H04M 1/0268 |
| | | | 361/807 |
| 2024/0080383 A1* | 3/2024 | Song | G06F 1/1652 |
| 2024/0094778 A1* | 3/2024 | Seo | G06F 1/1656 |

FOREIGN PATENT DOCUMENTS

| | | |
|---|---|---|
| KR | 10-1122196 | 3/2012 |
| KR | 10-2020-0117741 | 10/2020 |
| KR | 10-2021-0007773 | 1/2021 |
| KR | 10-2022-0030668 | 3/2022 |

* cited by examiner

*Primary Examiner* — Sagar Shrestha
(74) *Attorney, Agent, or Firm* — Lerner David LLP

(57) ABSTRACT

A display device includes a display module, an extension module that is disposed under the display module and that extends and retracts in a first direction, a main case that accommodates the extension module, and a plurality of sidewall cases that are spaced apart from each other in a second direction intersecting the first direction and that move in the first direction relative to the main case. The plurality of sidewall cases move in a third direction intersecting a plane defined by the first and second directions.

21 Claims, 26 Drawing Sheets

MR          BT  PRY1   SRL   SPW2  SPW3

SUP    SWC    GOP1    SPW1    MCS

SPW2    SLH    OP6    SWC

SGJ

SPR1

DISPLAY DEVICE

CROSS-REFERENCE TO RELATED APPLICATION(S)

This application claims priority to and benefits of Korean Patent Application No. 10-2022-0123790 under 35 U.S.C. § 119, filed on Sep. 28, 2022 in the Korean Intellectual Property Office, the entire contents of which are incorporated herein by reference.

BACKGROUND

1. Technical Field

Embodiments of the disclosure relate to a display device.

2. Description of the Related Art

Electronic devices, such as a smart phone, a digital camera, a notebook computer, a car navigation device, a smart television, and the like, which provide an image to a user include a display device for displaying an image. The display device generates an image and provides the image to the user through a display screen.

Recently, with the development of display device technology, various forms of display devices have been developed. For example, various display devices that can be curved or can be extended or retracted have been developed. The display devices may be readily carried and may improve user convenience.

A flexible display device may include a flexible display module. In a case in which opposite sides of a display screen do not move at the same speed in case that the display device is extended or retracted, a side of the display panel may be wrinkled. Furthermore, portions of opposite sides of the display panel may be exposed to the outside in case that the display device is extended or retracted. As the portions of the display panel are exposed to the outside, the display panel may be damaged by an external impact.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide a display device for improving surface quality of a display panel by preventing the display panel from being wrinkled in case that the display device is driven in an extended mode and for preventing portions of side surfaces of the display panel and a part of support bars from being exposed to the outside.

According to an embodiment, a display device may include a display module, an extension module that is disposed under the display module and that extends and retracts in a first direction, a main case that accommodates the extension module, and a plurality of sidewall cases that are spaced apart from each other in a second direction intersecting the first direction and that move in the first direction relative to the main case. The plurality of sidewall cases may move in a third direction intersecting a plane defined by the first and second directions.

The display module may be driven in a reduced mode in which the display module is retracted into the main case or in an extended mode in which the display module is extended outside the main case. The plurality of sidewall cases may move farther away from each other in the third direction in the extended mode than in the reduced mode.

The display device may further include a first elastic member that is disposed between the plurality of sidewall cases and that moves the plurality of sidewall cases toward or away from each other in the third direction.

The plurality of sidewall cases may move in the first direction along first guide openings defined on opposite sides of the main case disposed to be opposite each other in the second direction.

The display device may further include a support plate disposed under the display module, the support plate including a plate and a plurality of support bars disposed in the first direction together with the plate, and a moving plate disposed in the main case and coupled to the extension module and the plurality of support bars. The moving plate may be coupled to slide in the first direction relative to the extension module. A coupling support bar defined as a support bar furthest from the plate among the plurality of support bars may be coupled to the moving plate to slide in the first direction.

The main case may include a first bottom part including a flat plate shape defined by the first and second directions, and first sidewalls that extend upward from opposite sides of the first bottom part disposed to be opposite each other in the second direction, the first sidewalls including first guide openings defined therein. The plurality of sidewall cases move in the first direction in the first guide openings that extend in the first direction.

The moving plate may include a second bottom part including a flat plate shape defined by the first and second directions, the second bottom part being disposed on the first bottom part and including a plurality of second guide openings that extend in the first direction, and second sidewalls that extend upward from opposite sides of the second bottom part disposed to be opposite each other in the second direction. The coupling support bar may be coupled to the second bottom part and move in the first direction along the plurality of second guide openings.

The support plate may further include a plurality of coupling parts that couple the coupling support bar to the second bottom part. The plurality of coupling parts may extend from the coupling support bar and move in the first direction along the plurality of second guide openings in a state of being inserted into the plurality of second guide openings.

The extension module may include a plurality of connecting parts disposed in the second direction, and a plurality of second elastic members that connect the plurality of coupling parts and the plurality of connecting parts.

The extension module may include a base plate including a bottom part and base sidewalls that extend upward from opposite sides of the bottom part disposed to be opposite each other in the second direction, the base sidewalls include a plurality of first sliding openings that extend in the first direction and a plurality of second sliding openings disposed above the plurality of first sliding openings and that extend in the first direction, a fixed guide disposed in the plurality of first sliding openings and connected with the base plate, a fixed part disposed on the fixed guide, a sliding moving bar disposed in the second sliding openings and connected with the base plate, a center-of-rotation part that connects the base plate, the fixed part, and the sliding moving bar, and a first actuator connected with the center-of-rotation part. The center-of-rotation part may be rotated about a rotational axis parallel to the first direction in case that the first actuator rotates about a rotational axis parallel to the second direction.

The center-of-rotation part may include a rotational screw that extends in the first direction, and a first main gear disposed on a side of the rotational screw facing in the first direction. The first actuator may include a first motor, and a second main gear disposed on a side of the first motor facing in the second direction. The first main gear and the second main gear are engaged with each other to rotate.

The display device may further include a moving plate coupled to the extension module. In case that the center-of-rotation part rotates, the base plate, the fixed part, and the moving plate may move in the first direction and are spaced apart from each other.

The extension module may further include a plurality of first sliding bars connected to the fixed part and the base plate, and a plurality of second sliding bars connected to the fixed part and the sliding moving bar. First sides of the plurality of first sliding bars and first sides of the plurality of second sliding bars coupled to the fixed part may be engaged with each other to rotate, and second sides of the plurality of first sliding bars may be coupled to the base plate to slide, and second sides of the plurality of second sliding bars may be coupled to the sliding moving bar to slide.

The display device may further include a support plate disposed under the display module, the support plate including a plate and a plurality of support bars disposed in the first direction together with the plate, a moving plate coupled to the extension module, the moving plate including a second bottom part and second sidewalls that extends upward from opposite sides of the second bottom part disposed to be opposite each other in the second direction, and a main roller coupled to the second sidewalls of the moving plate disposed to be opposite each other in the second direction. Some of the plurality of support bars may be disposed on an outer surface of the main roller.

The display device may further include a second actuator that rotates the main roller about a rotational axis that extends in the second direction.

The display device may further include a sub-plate disposed under the moving plate. Some of the plurality of support bars may be disposed between the moving plate and the sub-plate.

The plurality of support bars may be disposed in a curved shape along the outer surface of the main roller after disposed in the first direction from the support plate and are disposed in the first direction between the moving plate and the sub-plate.

The sub-plate may be disposed to cover the plurality of support bars disposed on the outer surface of the main roller.

According to an embodiment, a display device may include a display module, a support plate that is disposed under the display module and that includes a plate, a plurality of support bars disposed in a first direction together with the plate, and a plurality of coupling parts that extend from a coupling support bar furthest from the plate among the plurality of support bars, an extension module that is disposed under the plate and that extends and retracts in the first direction, a main case that accommodates the extension module, a moving plate disposed in the main case and coupled to the extension module and the plurality of support bars, and a plurality of sidewall cases that are spaced apart from each other in a second direction intersecting the first direction and that move in the first direction relative to the main case. The plurality of coupling parts may be inserted into guide openings defined in the moving plate and move along the guide openings. The extension module may include a plurality of connecting parts spaced apart from each other in the second direction, and a plurality of elastic members disposed between the plurality of connecting parts and the plurality of coupling parts and connected to the plurality of connecting parts and the plurality of coupling parts. The plurality of sidewall cases may move in a third direction intersecting a plane defined by the first and second directions.

A display device may include a display module, an extension module that is disposed under the display module and that extends and retracts in a first direction, a main case that accommodates the extension module, a plurality of sidewall cases disposed on opposite sides of the main case opposite each other in a second direction intersecting the first direction and disposed in a third direction intersecting a plane defined by the first and second directions, and a plurality of first elastic members disposed between the plurality of sidewall cases disposed in the third direction.

BRIEF DESCRIPTION OF THE DRAWINGS

The above and other aspects and features of the disclosure will become apparent by describing in detail embodiments thereof with reference to the accompanying drawings.

DETAILED DESCRIPTION OF THE EMBODIMENTS

Figure 1:
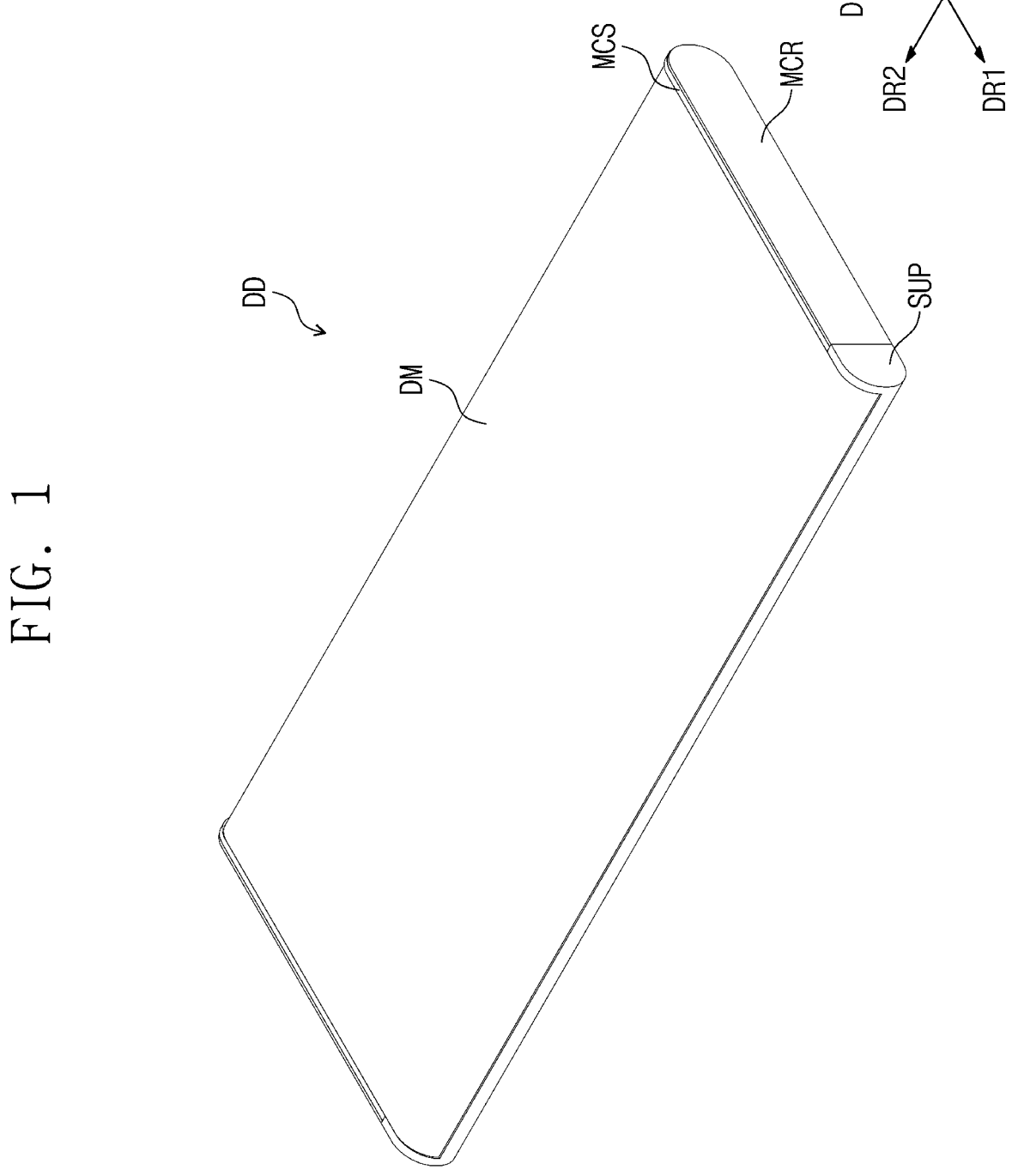
FIG. 1 is a schematic perspective view of a display device according to an embodiment of the disclosure.

The above and other aspects, features, and advantages of the disclosure will become apparent from the following description of embodiments given in conjunction with the accompanying drawings. However, the disclosure is not limited to the embodiments disclosed herein and may be implemented in various different forms. Herein, the embodiments are disclosed to provide thorough understanding of the disclosure to those skilled in the art to which the disclosure pertains, and the scope of the disclosure should not be limited thereto. Like reference numerals refer to like elements throughout.

As used herein, the singular forms, "a," "an," and "the" are intended to include the plural forms as well, unless the context clearly indicates otherwise.

When one element or layer is referred to as being "on" another element or layer, it can be directly on the other element or layer, or intervening elements or layers may be present. In contrast, when one element is referred to as being "directly on" another element or layer, there may be no intervening elements or layers present.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

Spatially relative terms, such as "below", "beneath", "lower", "above", "upper" and the like, may be used to readily describe a correlation between one element or component and another element or component as illustrated in the drawings. The spatially relative terms should be understood as terms including different directions of an element during use or operation in addition to the direction illustrated in the drawings.

Although the terms "first," "second," and the like are used herein to describe various elements, components, and/or sections, these elements, components, and/or sections should not be limited by these terms. These terms are only used to distinguish one element, component, or section from another element, component, or section. Accordingly, a first element, a first component, or a first section mentioned below could be termed a second element, a second component, or a second section while staying within the spirit and scope of the disclosure.

Embodiments described herein will be described with reference to plan views and sectional views which are ideal schematic views of the disclosure. Accordingly, the forms of illustrative drawings may be changed according to manufacturing technology and/or allowable errors. Embodiments of the disclosure are not limited to specific forms illustrated, but include changes in the forms generated according to manufacturing processes. Regions illustrated in the drawings have schematic properties, and the shapes of the regions illustrated in the drawings illustrate specific forms of regions of devices and are not intended to limit the scope of the disclosure.

"Approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
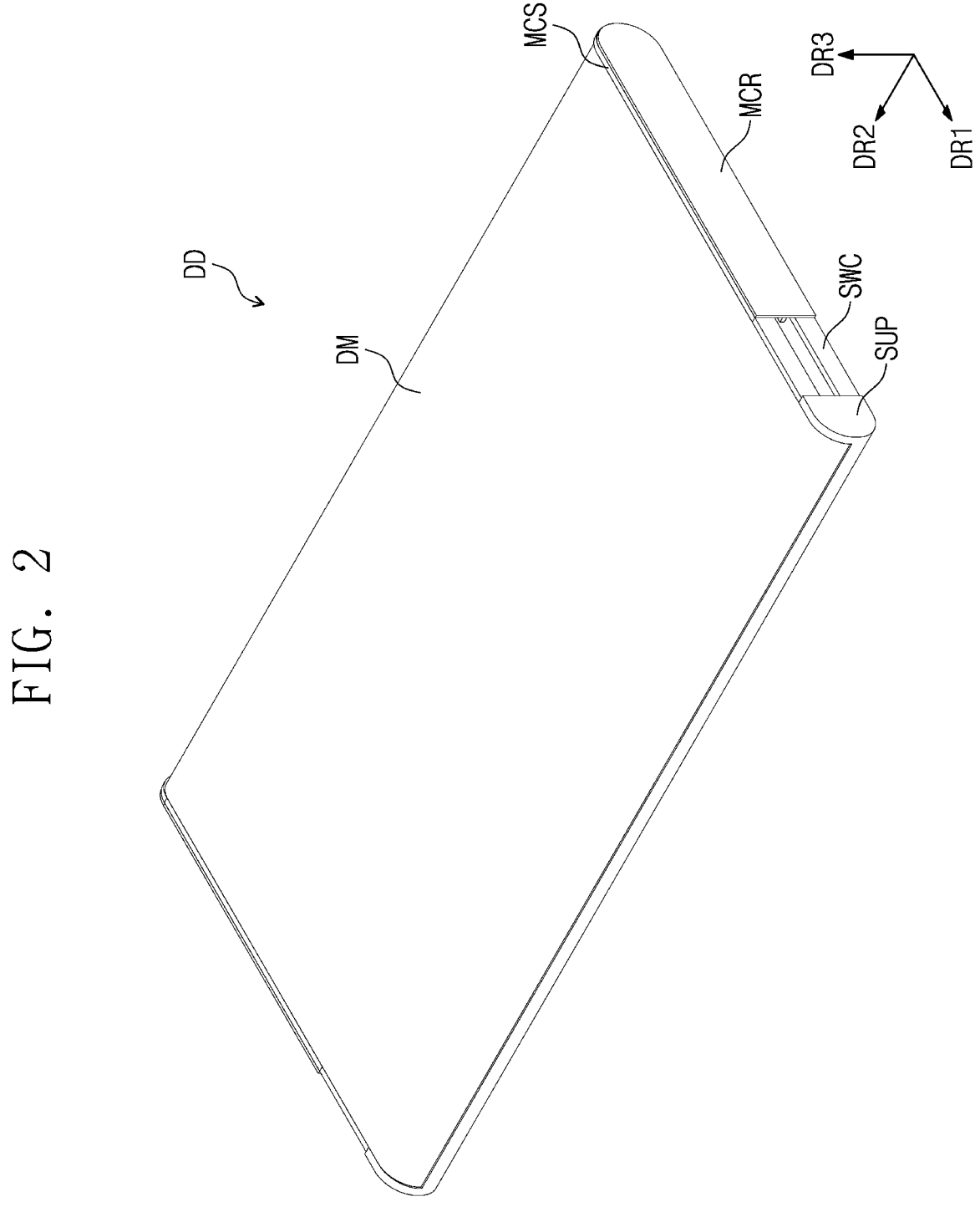
FIG. 2 is a schematic view for describing an extended mode of the display device illustrated in FIG. 1.

FIG. 1 is a schematic perspective view of a display device according to an embodiment of the disclosure. FIG. 2 is a schematic view for describing an extended mode of the display device illustrated in FIG. 1.

Referring to FIGS. 1 and 2, the display device DD according to an embodiment of the disclosure may have a rectangular shape with short sides extending in a first direction DR1 and long sides extending in a second direction DR2 intersecting (crossing) the first direction DR1. However, without being limited thereto, the display device DD may have various shapes such as a circular shape, a polygonal shape, and the like. The display device DD may be a flexible display device DD.

Hereinafter, a direction substantially perpendicular to a plane defined by the first direction DR1 and the second direction DR2 may be defined as a third direction DR3. Furthermore, the expression "in plan view" used herein may mean that it is viewed in third direction DR3.

The display device DD may include a display module DM, a main case MCS, sidewall cases SWC, main sidewall covers MCR, and a sub-plate SUP.

The sub-plate SUP may move toward or away from the main case MCS in the first direction DR1. In case that the sub-plate SUP moves in the first direction DR1, the area of an exposed surface of the display module DM may be adjusted depending on the movement of the sub-plate SUP. In case that the display module DM is inserted into the main case MCS, a mode of the display device DD may be defined as a reduced mode. In case that the display module DM is extended outside the main case MCS, a mode of the display device DD may be defined as an extended mode. The reduced mode and the extended mode of the display device DD may be implemented depending on the movement of the sub-plate SUP.

The main sidewall covers MCR may be disposed on opposite sides of the main case MCS disposed to be opposite each other in the second direction DR2. A side of each of the main sidewall covers MCR in the first direction DR1 may have a semicircular shape. An opposite side of the main sidewall cover MCR may extend in the third direction DR3.

In case that the display device DD is in the extended mode, two pairs of sidewall cases SWC may be disposed on opposite sides of the display module DM disposed to be opposite each other in the second direction DR2. The sidewall cases SWC disposed on a side of the display module DM may face each other in the third direction DR3, and the sidewall cases SWC disposed on the opposite side of the display module DM may face each other in the third direction DR3.

In case that the display device DD is in the reduced mode, the sidewall cases SWC may be accommodated in the main case MCS. In case that the display device DD is in the extended mode, the sidewall cases SWC may be exposed to the outside. The movement of the sidewall cases SWC will be described below in detail with reference to FIGS. 24A to 25B.

Figure 3:
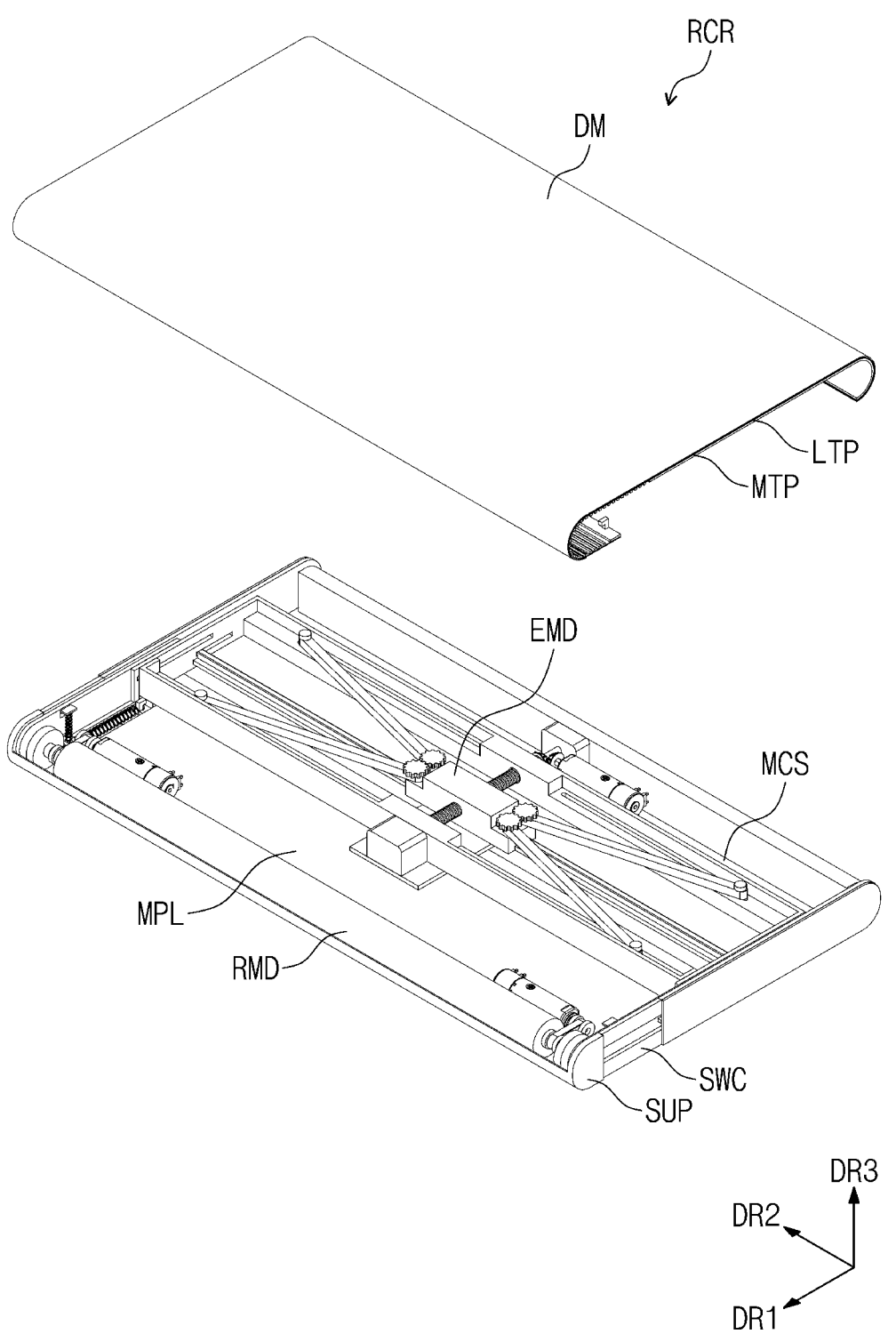
FIG. 3 is an exploded schematic perspective view of the display device illustrated in FIG. 2.
Figure 4:
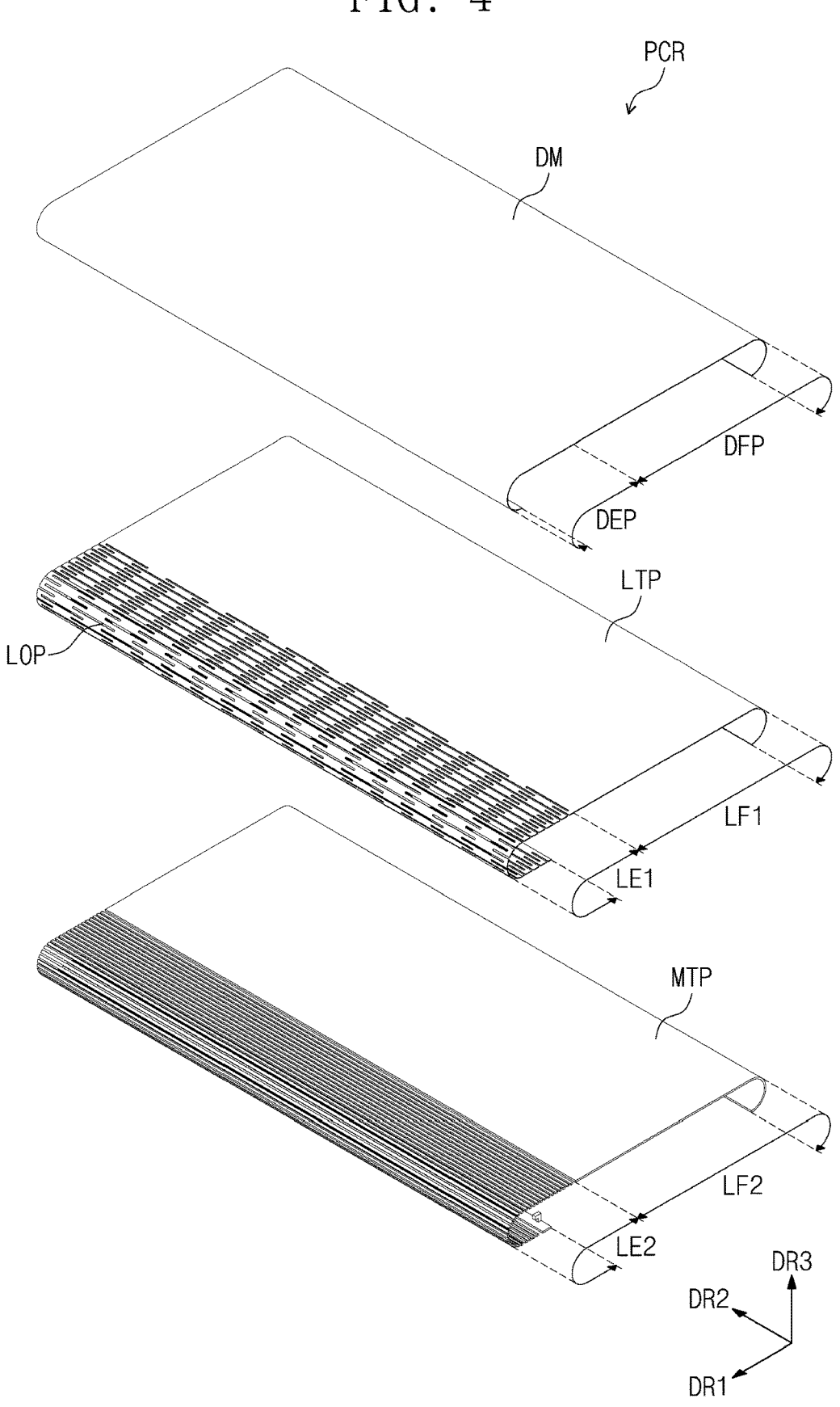
FIG. 4 is an exploded schematic perspective view of a module set illustrated in FIG. 3.
Figure 5A:
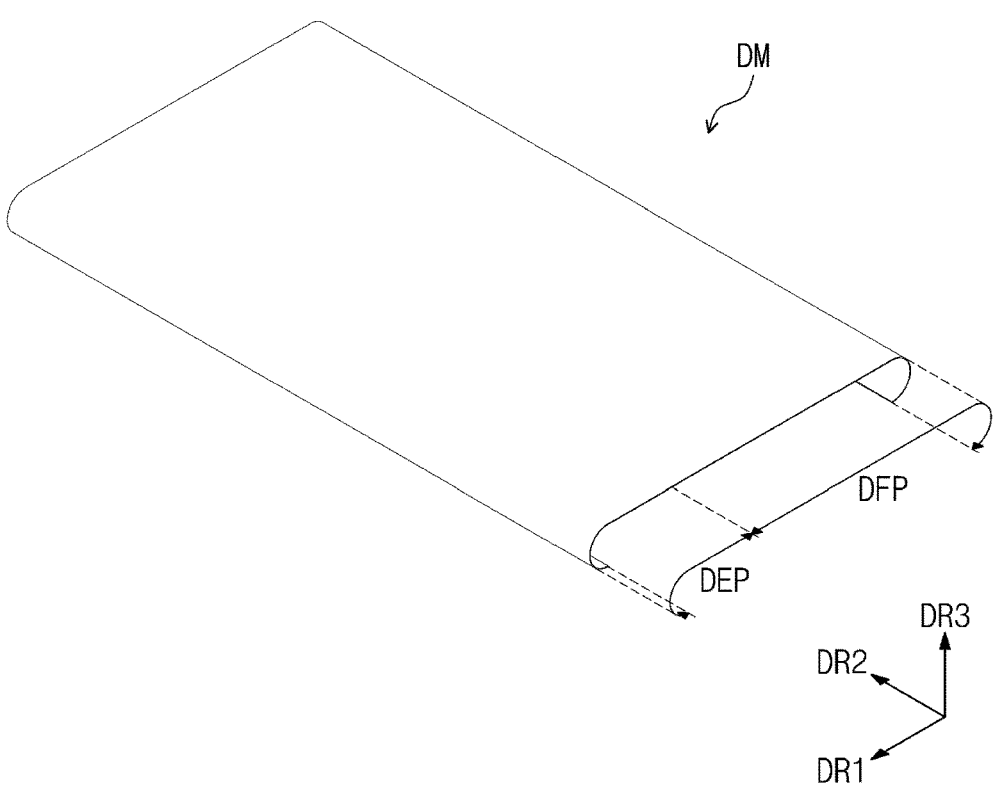
FIG. 5A is a schematic view illustrating a display module of FIG. 4 in the extended mode.
Figure 5B:
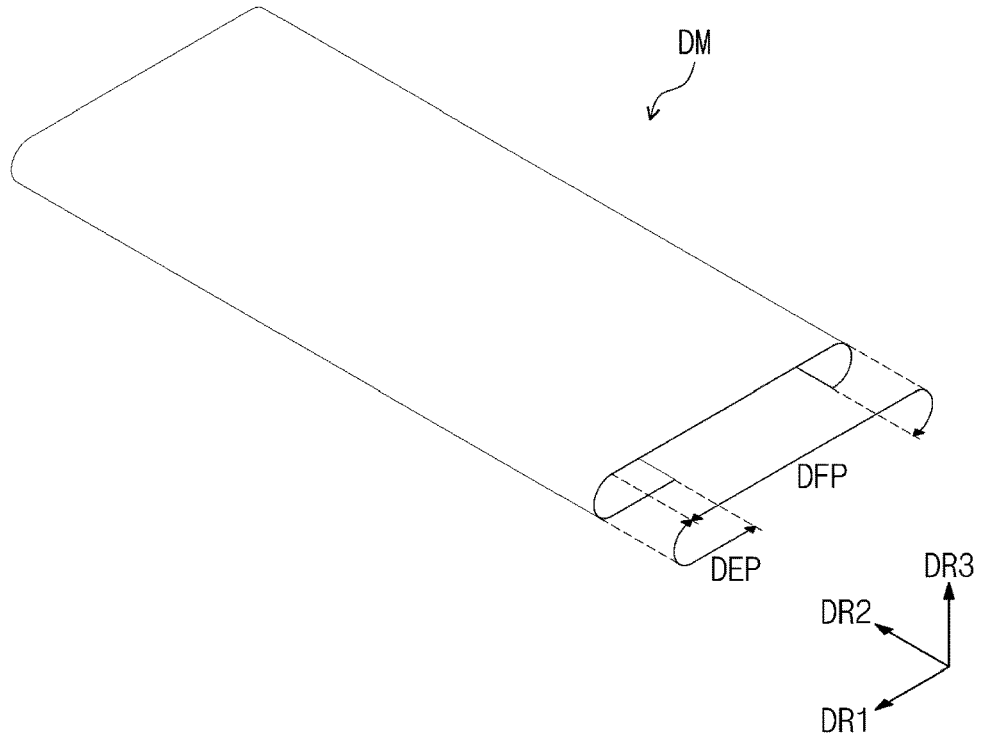
FIG. 5B is a schematic view illustrating the display module of FIG. 4 in a reduced mode.

FIG. 3 is an exploded schematic perspective view of the display device illustrated in FIG. 2. FIG. 4 is an exploded schematic perspective view of a module set illustrated in FIG. 3. FIG. 5A is a schematic view illustrating the display module of FIG. 4 in the extended mode. FIG. 5B is a schematic view illustrating the display module of FIG. 4 in the reduced mode.

FIG. 3 is an exploded schematic perspective view of the display device DD in case that an extension module EMD is in an extended mode.

Referring to FIG. 3, the display device DD may include the module set RCR, a moving plate MPL, a roller module RMD, and the extension module EMD. The module set RCR may be accommodated in the main case MCS. The module set RCR may include the display module DM, an upper plate LTP, and a support plate MTP.

The moving plate MPL, the roller module RMD, and the extension module EMD may be disposed under the module set RCR. The moving plate MPL, the roller module RMD, and the extension module EMD may be disposed in the main case MCS.

The extension module EMD may be extended and retracted in the first direction DR1. The moving plate MPL may be connected to the extension module EMD. The moving plate MPL may be accommodated in the main case MCS and may move in the first direction DR1 relative to the main case MCS. The sub-plate SUP may be disposed outside the roller module RMD and may extend below the main case MCS. The sub-plate SUP, the roller module RMD, the extension module EMD, and the main case MCS will be described below in detail with reference to FIGS. 13 to 19B.

Referring to FIGS. 4, 5A, and 5B, in case that the display module DM is in an unfolded state, the display module DM may have a rectangular shape with short sides extending in the first direction DR1 and long sides extending in the second direction DR2. In case that the display module DM is accommodated in the main case MCS, opposite sides of the display module DM disposed to be opposite each other in the first direction DR1 may have a curved shape convex toward the outside.

The display module DM may be driven in the reduced mode in which the display module DM is retracted into the main case MCS of FIG. 3 or in the extended mode in which the display module DM is extended outside the main case MCS. The display module DM may include a fixed region DFP and an extension region DEP. In case that the display device DD is in the reduced mode or the extended mode as illustrated in FIGS. 1 and 2, a portion of the display module DM that does not change the area may be defined as the fixed region DFP, and a portion of the display module DM that changes the area may be defined as the extension region DEP.

In case that the display device DD is in the extended mode as illustrated in FIG. 2, a portion of the extension region DEP may be exposed to the outside so as to be flat. The extension region DEP may extend from the fixed region DFP in the first direction DR1. As illustrated in FIG. 5A, the fixed region DFP and the extension region DEP may be arranged in the first direction DR1.

The display module DM will be described below in detail with reference to FIGS. 6 to 8.

Referring to FIG. 4, the upper plate LTP may be disposed under the display module DM. An upper surface of the upper plate LTP may be attached to a lower surface of the display module DM.

In case that the upper plate LTP is in an unfolded state, the upper plate LTP may have a rectangular shape with long sides extending in the first direction DR1 and short sides extending in the second direction DR2. In case that the upper plate LTP is accommodated in the main case MCS, opposite sides of the upper plate LTP disposed to be opposite each other in the first direction DR1 may have a curved shape convex toward the outside.

The upper plate LTP may include a metallic material such as stainless steel (e.g., SUS 316). However, the metallic material of the upper plate LTP is not limited thereto. Furthermore, without being limited thereto, the upper plate LTP may include a non-metallic material such as plastic.

The upper plate LTP may include a first fixed portion LF1 and a first extension LE1. The first fixed portion LF1 may overlap the fixed region DFP of the display module DM. The first extension LE1 may overlap the extension region DEP. The first extension LE1 may extend from the first fixed portion LF1.

Multiple opening patterns LOP may be defined in the first extension LE1. The opening patterns LOP may overlap the extension region DEP of the display module DM. As the opening patterns LOP are defined, the stiffness of the first extension LE1 may be decreased. Accordingly, in case that the opening patterns LOP are defined in the upper plate LTP, the flexibility of the upper plate LTP may be increased, as compared with a case where the opening patterns LOP are not defined in the upper plate LTP. Thus, the upper plate LTP may be more readily folded.

The support plate MTP may be disposed under the upper plate LTP and the display module DM. An upper surface of the support plate MTP may be attached to a lower surface of the upper plate LTP. The support plate MTP and the upper plate LTP may be coupled through welding. However, without being limited thereto, the support plate MTP and the upper plate LTP may be coupled through various methods.

The support plate MTP may include a metallic material such as stainless steel (e.g., SUS 316). However, the metallic material of the support plate MTP is not limited thereto. Furthermore, without being limited thereto, the support plate MTP may include a non-metallic material such as plastic.

The support plate MTP may include a second fixed portion LF2 and a second extension LE2. The second fixed portion LF2 may overlap the first fixed portion LF1 and the fixed region DFP. The second extension LE2 may overlap the first extension LE1 and the extension region DEP. The support plate MTP will be described below in detail with reference to FIGS. 9 to 11.

Figure 6:
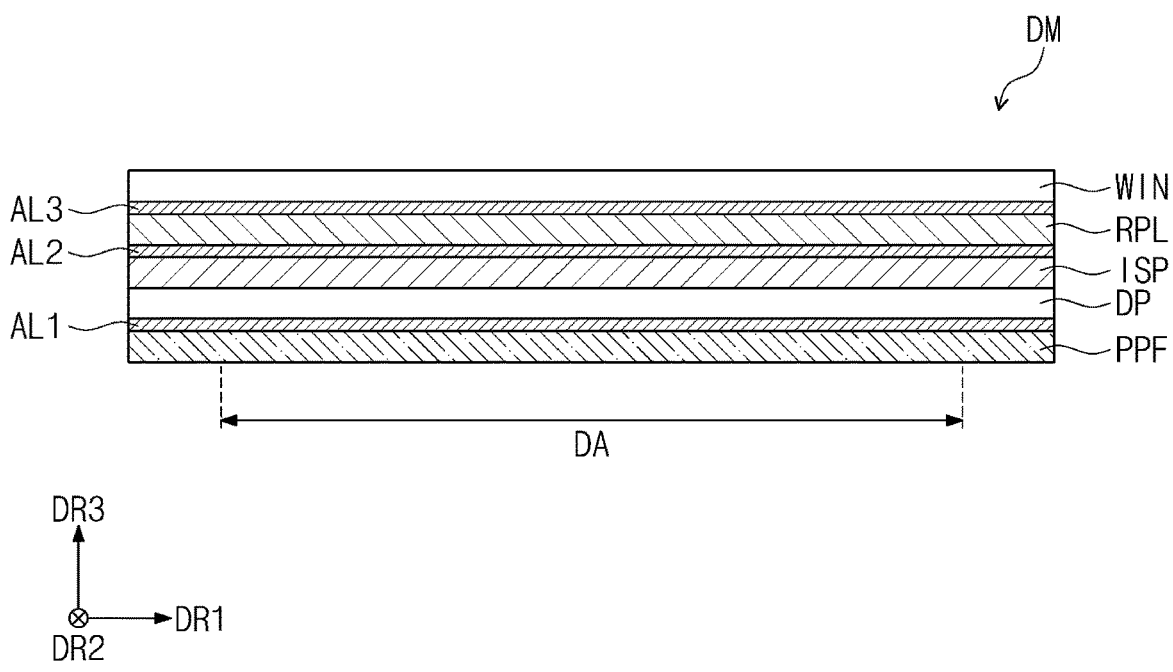
FIG. 6 is a schematic view illustrating a section of the display module illustrated in FIG. 4.

FIG. 6 is a schematic view illustrating a section of the display module illustrated in FIG. 4.

In FIG. 6, a section of the display module DM viewed in the second direction DR2 is illustrated.

Referring to FIG. 6, the display module DM may include a display panel DP, an input sensing part ISP, an anti-reflection layer RPL, a window WIN, a panel protection film PPF, and first to third adhesive layers AL1, AL2, and AL3.

The display panel DP may be a flexible display panel. The display panel DP according to an embodiment of the disclosure may be an emissive display panel, but is not particularly limited. For example, the display panel DP may be an organic light emitting display panel or an inorganic light emitting display panel. An emissive layer of the organic light emitting display panel may include an organic light emitting material. An emissive layer of the inorganic light emitting display panel may include quantum dots, quantum rods, and the like. Hereinafter, an example where the display panel DP is an organic light emitting display panel will be discussed.

The input sensing part ISP may be disposed on the display panel DP. The input sensing part ISP may include sensing units (not illustrated) for sensing an external input in a capacitive manner. The input sensing part ISP may be directly manufactured on the display panel DP in manufacturing the display device DD. However, without being limited thereto, the input sensing part ISP may be manufactured as a panel separate from the display panel DP and may be attached to the display panel DP by an adhesive layer.

The anti-reflection layer RPL may be disposed on the input sensing part ISP. The anti-reflection layer RPL may be defined as a film for preventing reflection of external light. The anti-reflection layer RPL may decrease the reflectivity of external light incident toward the display panel DP from above the display device DD.

In case that external light travelling toward the display panel DP is reflected from the display panel DP and provided back to a user, the user may visually recognize the external light as in a mirror. To prevent such a phenomenon, the anti-reflection layer RPL may include color filters that display the same colors as those of pixels of the display panel DP.

External light may be filtered in the same colors as those of the pixels by the color filters. The external light may not be visible to the user. However, without being limited thereto, the anti-reflection layer RPL may include a phase retarder and/or a polarizer to decrease the reflectivity of external light.

The window WIN may be disposed on the anti-reflection layer RPL. The window WIN may protect the display panel DP, the input sensing part ISP, and the anti-reflection layer RPL from external scratches and impacts.

The panel protection film PPF may be disposed under the display panel DP. The panel protection film PPF may protect the bottom of the display panel DP. The panel protection film PPF may include a flexible plastic material such as polyethylene terephthalate (PET).

The first adhesive layer AL1 may be disposed between the display panel DP and the panel protection film PPF, and the display panel DP and the panel protection film PPF may be bonded to each other by the first adhesive layer ALL The second adhesive layer AL2 may be disposed between the anti-reflection layer RPL and the input sensing part ISP, and the anti-reflection layer RPL and the input sensing part ISP may be bonded to each other by the second adhesive layer AL2. The third adhesive layer AL3 may be disposed between the window WIN and the anti-reflection layer RPL, and the window WIN and the anti-reflection layer RPL may be bonded to each other by the third adhesive layer AL3.

Figure 7:
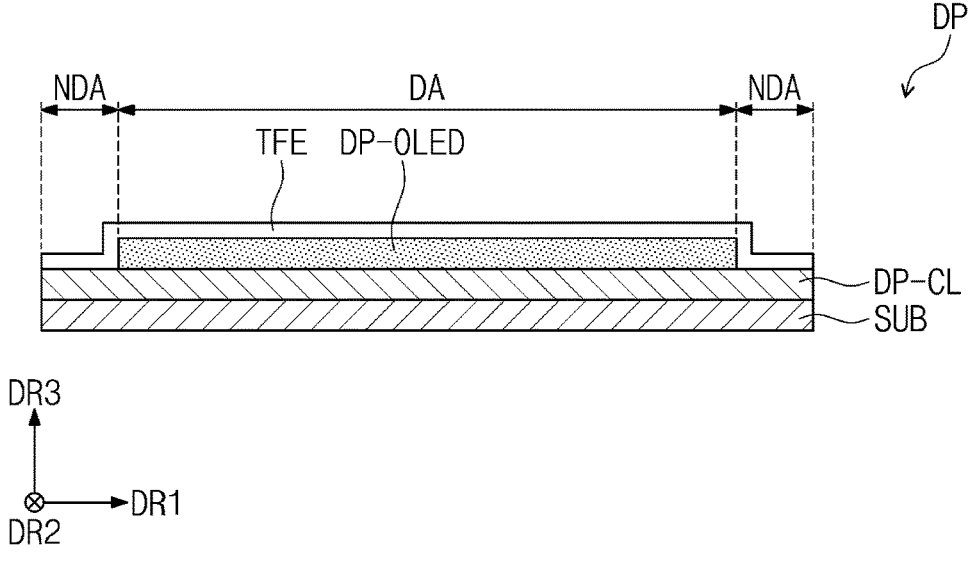
FIG. 7 is a schematic view illustrating a section of a display panel illustrated in FIG. 6.

FIG. 7 is a schematic view illustrating a section of the display panel illustrated in FIG. 6.

In FIG. 7, a section of the display panel DP viewed in the second direction DR2 is illustrated.

Referring to FIG. 7, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display region DA and a non-display region NDA around the display region DA. The substrate SUB may include a flexible plastic material such as polyimide (PI). The display element layer DP-OLED may be disposed on the display region DA.

Multiple pixels may be disposed in the circuit element layer DP-CL and the display element layer DP-OLED. Each of the pixels may include transistors disposed in the circuit element layer DP-CL and a light emitting element disposed in the display element layer DP-OLED and connected to the transistors. A configuration of a pixel will be described below in detail.

The thin film encapsulation layer TFE may be disposed on the circuit element layer DP-CL to cover the display element layer DP-OLED. The thin film encapsulation layer TFE may protect the pixels from moisture, oxygen, and external foreign matter.

Figure 8:
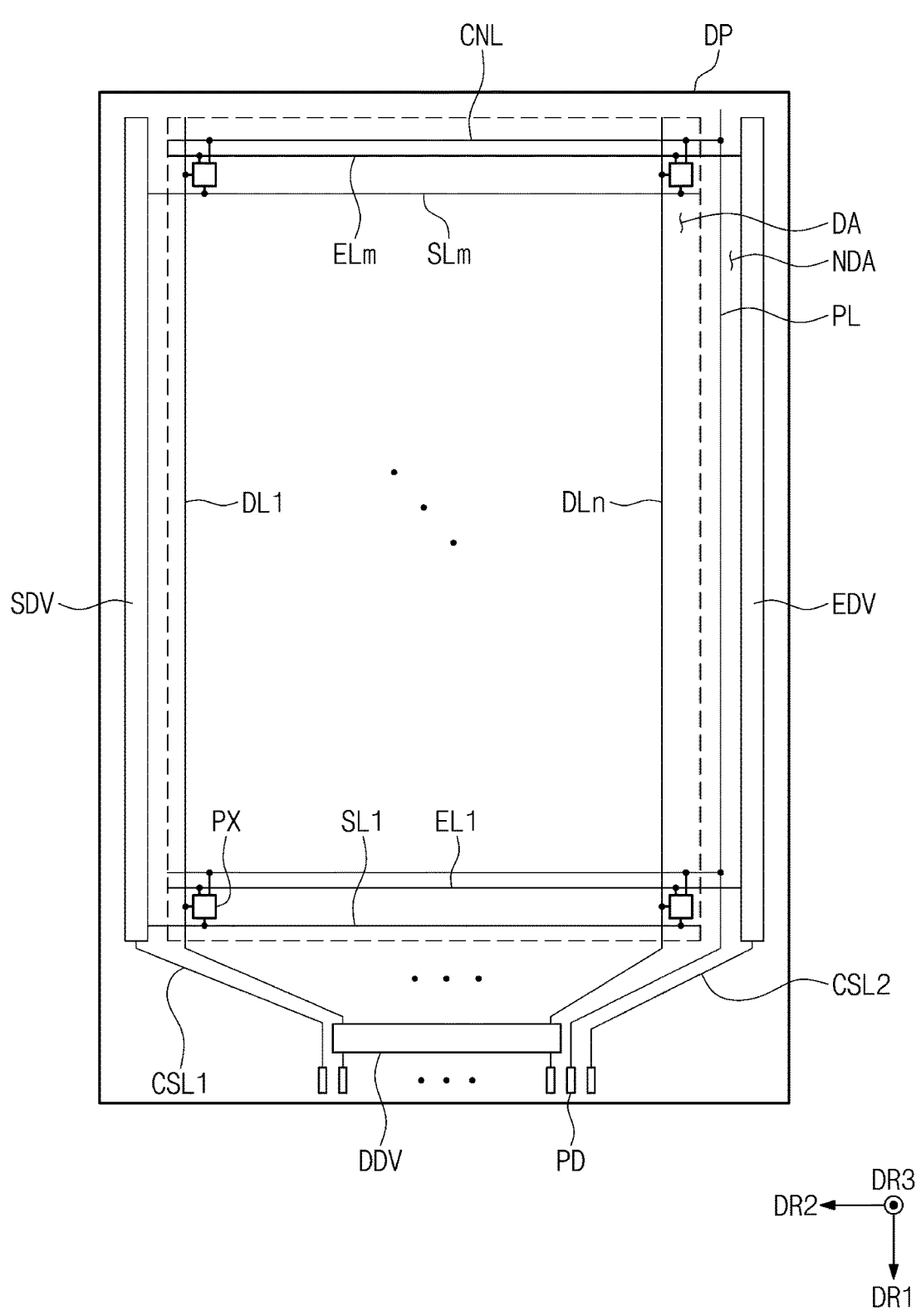
FIG. 8 is a schematic plan view of the display panel illustrated in FIG. 7.

FIG. 8 is a schematic plan view of the display panel illustrated in FIG. 7.

Referring to FIG. 8, the display panel DP may include a scan driver SDV, a data driver DDV, a light emission driver EDV, and pads PD.

The display panel DP may have a rectangular shape with long sides extending in the first direction DR1 and short sides extending in the second direction DR2. However, the shape of the display panel DP is not limited thereto. The display panel DP may include a display region DA and a non-display region NDA surrounding the display region DA.

The display panel DP may include pixels PX, scan lines SL1 to SLm, data lines DL1 to DLn, light emission lines EL1 to ELm, first and second control lines CSL1 and CSL2, a power line PL, and connecting lines CNL. "m" and "n" are natural numbers.

The pixels PX may be disposed in the display region DA. The scan driver SDV and the light emission driver EDV may be disposed in the non-display regions NDA adjacent to the long sides of the display panel DP. The data driver DDV may be disposed in the non-display region NDA adjacent to one of the short sides of the display panel DP. The data driver DDV may be adjacent to a lower end of the display panel DP in plan view.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines EL1 to ELm may extend in the second direction DR2 and may be connected to the pixels PX and the light emission driver EDV.

The power line PL may extend in the first direction DR1 and may be disposed in the non-display region NDA. The power line PL may be disposed between the display region DA and the light emission driver EDV. However, without being limited thereto, the power line PL may be disposed between the display region DA and the scan driver SDV.

The connecting lines CNL may extend in the second direction DR2. The connecting lines CNL may be arranged in the first direction DR1 and may be connected to the power line PL and the pixels PX. A drive voltage may be applied to the pixels PX through the power line PL and the connecting lines CNL connected with each other.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The data lines DL1 to DLn may be connected to the corresponding pads PD through the data driver DDV. For example, the data lines DL1 to DLn may be connected to the data driver DDV, and the data driver DDV may be connected to the pads PD corresponding to the data lines DL1 to DLn.

The data lines DL1 to DLn may be connected to the data driver DDV, and the data driver DDV may be connected to the pads PD corresponding to the data lines DL1 to DLn.

Although not illustrated, a printed circuit board may be connected to the pads PD, and a timing controller and a voltage generator may be disposed on the printed circuit board. The timing controller may be manufactured in the form of an integrated circuit chip and may be mounted on the printed circuit board. The timing controller and the voltage generator may be connected to the pads PD through the printed circuit board.

A scan control signal may be provided to the scan driver SDV through the first control line CSL1. A light emission control signal may be provided to the light emission driver EDV through the second control line CSL2. A data control signal may be provided to the data driver DDV. The timing controller may receive image signals from the outside, may convert the data format of the image signals according to the specification of an interface with the data driver DDV, and may provide the converted signals to the data driver DDV.

The scan driver SDV may generate scan signals in response to the scan control signal. The scan signals may be applied to the pixels PX through the scan lines SL1 to SLm. The scan signals may be sequentially applied to the pixels PX.

The data driver DDV may generate data voltages corresponding to the image signals in response to the data control signal. The data voltages may be applied to the pixels PX through the data lines DL1 to DLn. The light emission driver EDV may generate light emission signals in response to the light emission control signal. The light emission signals may be applied to the pixels PX through the light emission lines EL1 to ELm.

The pixels PX may receive the data voltages in response to the scan signals. The pixels PX may display an image by emitting light having luminance corresponding to the data voltages in response to the light emission signals. Light emission time of the pixels PX may be controlled by the light emission signals.

Figure 9:
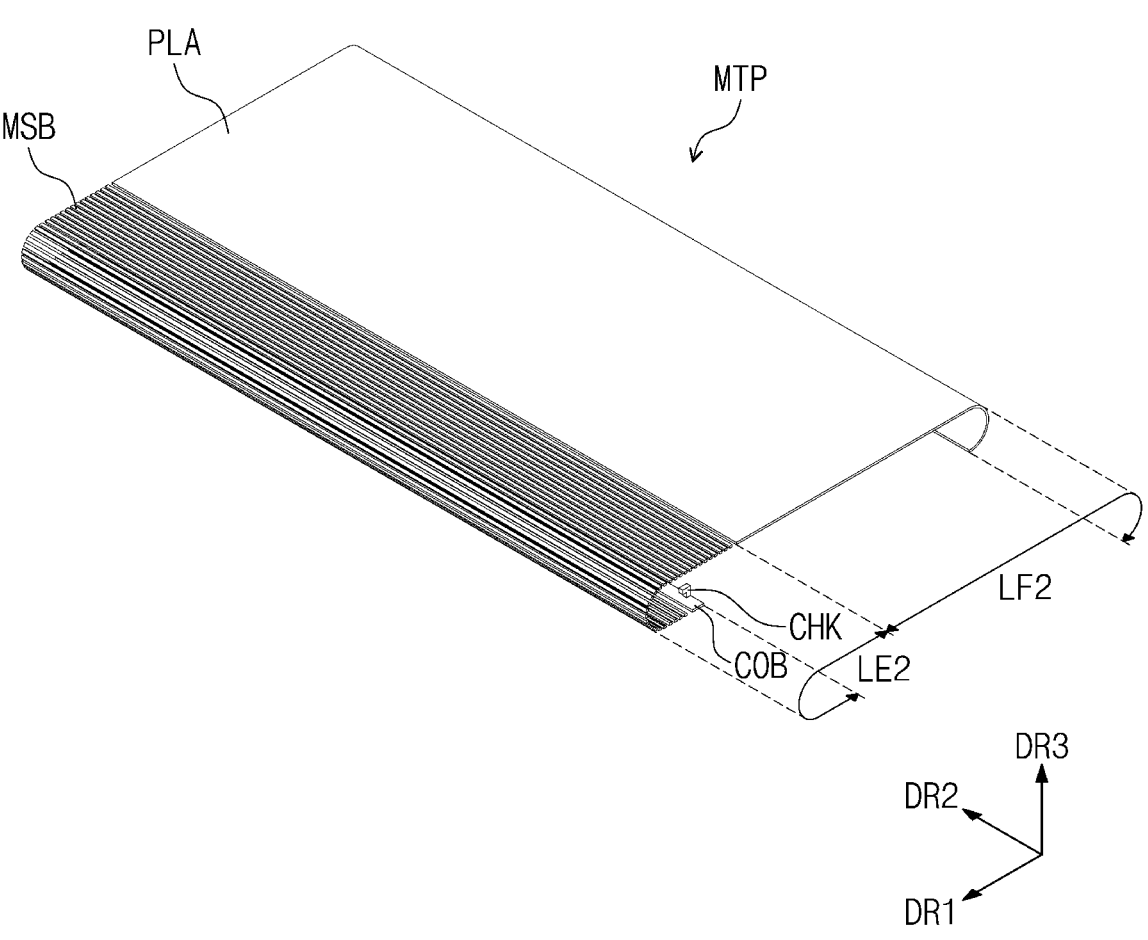
FIG. 9 is a schematic perspective view of a support plate illustrated in FIG. 4.
Figure 10:
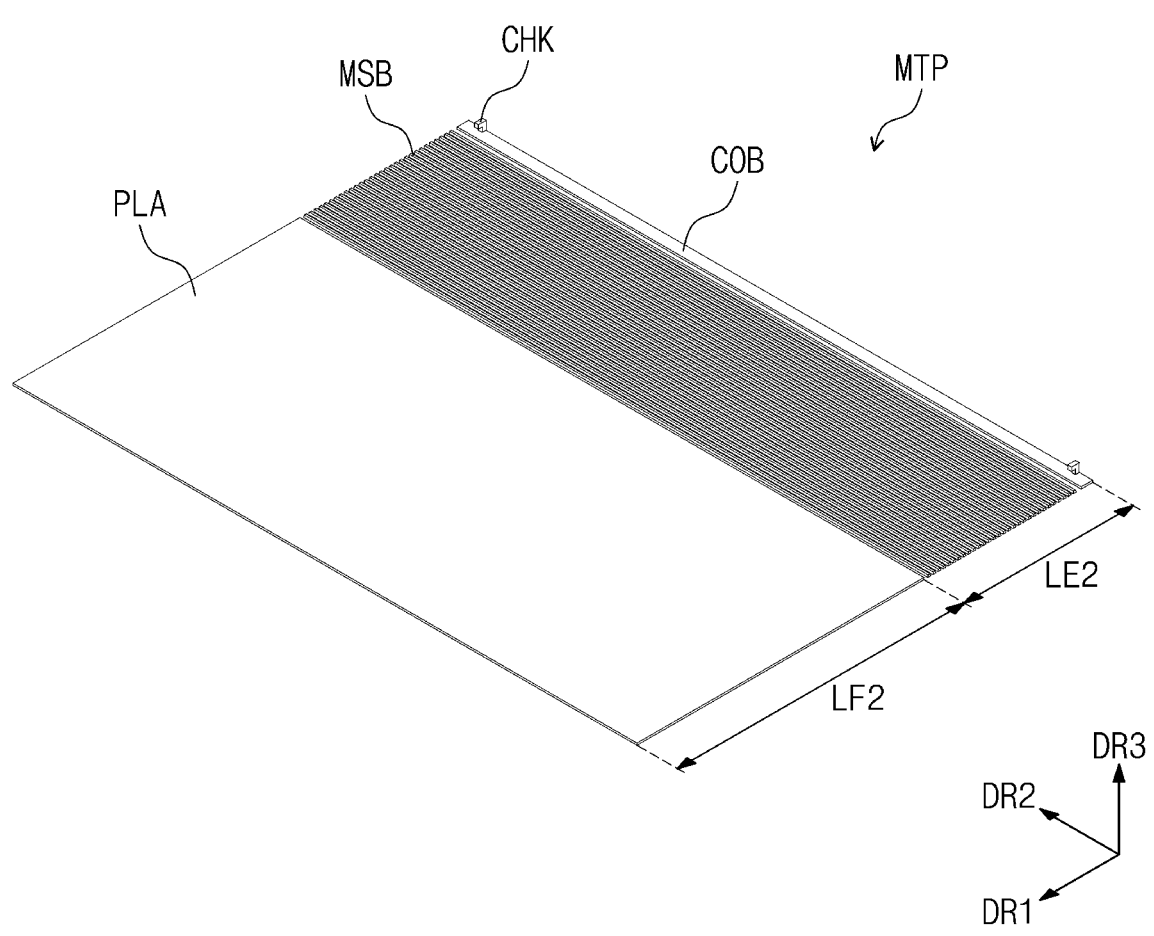
FIG. 10 is a schematic perspective view illustrating a flat state of the support plate of FIG. 9.
Figure 11:
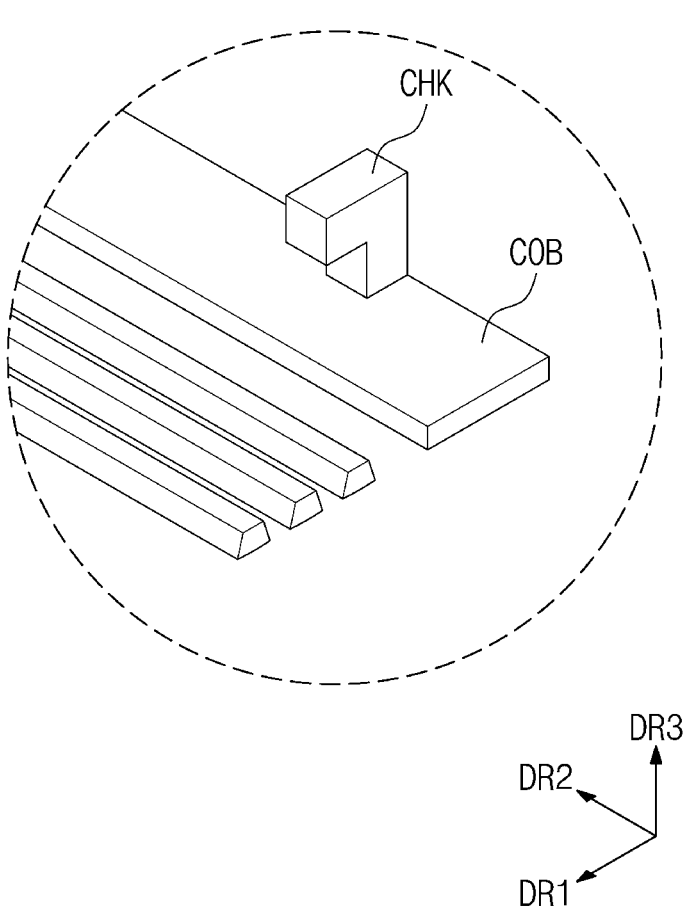
FIG. 11 is an enlarged schematic view of a coupling part illustrated in FIGS. 9 and 10.

FIG. 9 is a schematic perspective view of the support plate illustrated in FIG. 4. FIG. 10 is a schematic perspective view illustrating a flat state of the support plate of FIG. 9. FIG. 11 is an enlarged schematic view of a coupling part illustrated in FIGS. 9 and 10.

Referring to FIGS. 9, 10, and 11, the support plate MTP may include the second fixed portion LF2 and the second extension LE2. The second fixed portion LF2 may include a plate PLA that has a rectangular shape with long sides extending in the first direction DR1 and short sides extending in the second direction DR2 in case unfolded. In case that the support plate MTP is accommodated in the main case MCS illustrated in FIG. 3, a side of both sides of the second fixed portion LF2 which are opposite to each other in the first direction DR1 may have a curved shape. The side of the second fixed portion LF2 may be defined as a side that faces away from an opposite side of the second fixed portion LF2 that faces the second extension LE2.

The second extension LE2 may include support bars MSB. The support bars MSB may extend in the second direction DR2 and may be arranged in the first direction DR1. The support bars MSB and the plate PLA may be arranged in the first direction DR1. A space between two support bars MSB adjacent to each other may overlap the opening patterns LOP defined in the upper plate LTP illustrated in FIG. 4.

A support bar MSB furthest from the plate PLA among the support bars MSB may be defined as a coupling support bar COB. The support plate MTP may include coupling parts CHK. The coupling parts CHK may be disposed on an upper surface of the coupling support bar COB. The coupling parts CHK may be disposed adjacent to opposite sides of the coupling support bar COB disposed to be opposite each other in the second direction DR2.

The coupling parts CHK may extend from the coupling support bar COB in the third direction DR3 and the first direction DR1. The coupling parts CHK may be integrally formed with the coupling support bar COB. However, without being limited thereto, the coupling parts CHK may be manufactured separately from the coupling support bar COB and may be connected to the coupling support bar COB. The coupling parts CHK, when viewed in the second direction DR2, may have a shape in which an "L" shape is turned upside down. The coupling parts CHK may be coupled to the moving plate MPL of FIG. 3. A coupling relationship between the coupling parts CHK and the moving plate MPL will be described below in detail with reference to FIGS. 20 and 21.

Figure 12A:
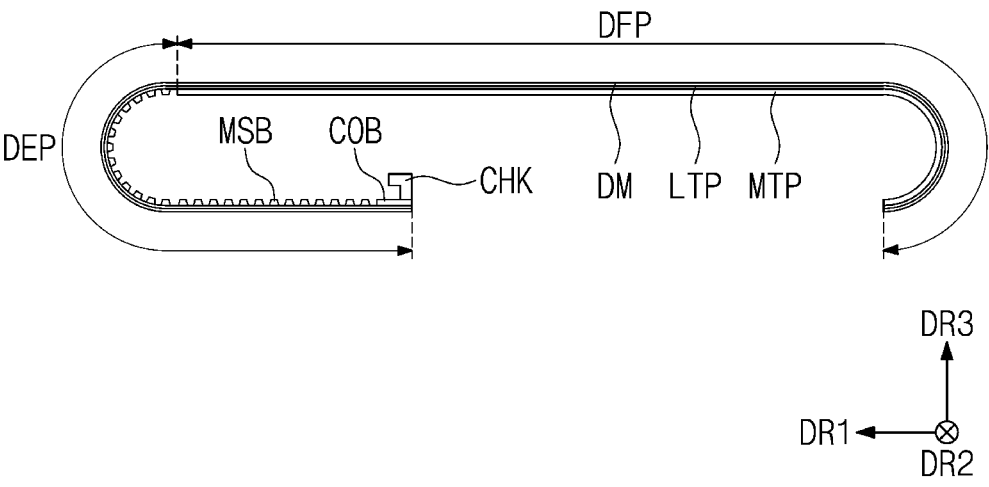
FIGS. 12A and 12B are schematic side views of the module set illustrated in FIG. 4.
Figure 12B:
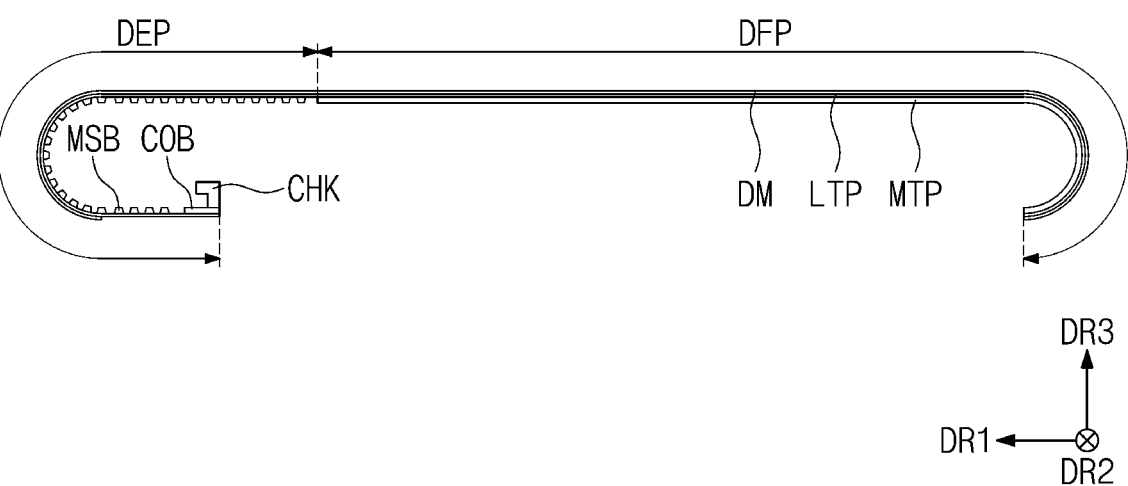

FIGS. 12A and 12B are schematic side views of the module set illustrated in FIG. 4.

The display module DM, the upper plate LTP, and the support plate MTP of FIGS. 12A and 12B may be identical to the display module DM, the upper plate LTP, and the support plate MTP of FIGS. 3 to 11 and therefore will be omitted from the description or will be briefly described.

FIGS. 12A and 12B illustrate a side surface of the module set viewed in the second direction DR2.

Referring to FIGS. 12A and 12B, the display module DM, the upper plate LTP, and the support plate MTP may be connected together. The support plate MTP and the upper plate LTP may have the same length in the first direction DR1. The display module DM may be shorter in the first direction DR1 than the support plate MTP and the upper plate LTP.

In case that the display device DD illustrated in FIG. 1 is changed from the reduced mode to the extended mode, a portion of the extension region DEP may be exposed to the outside so as to be flat. For example, in case that the support bars MSB of the support plate MTP move along an outer surface of a main roller MR illustrated in FIG. 20A, the upper plate LTP and the display module DM attached to the support plate MTP may be moved in the first direction DR1 and the third direction DR3. The movement of the support plate MTP will be described below in detail with reference to FIGS. 21 to 24.

Figure 13:
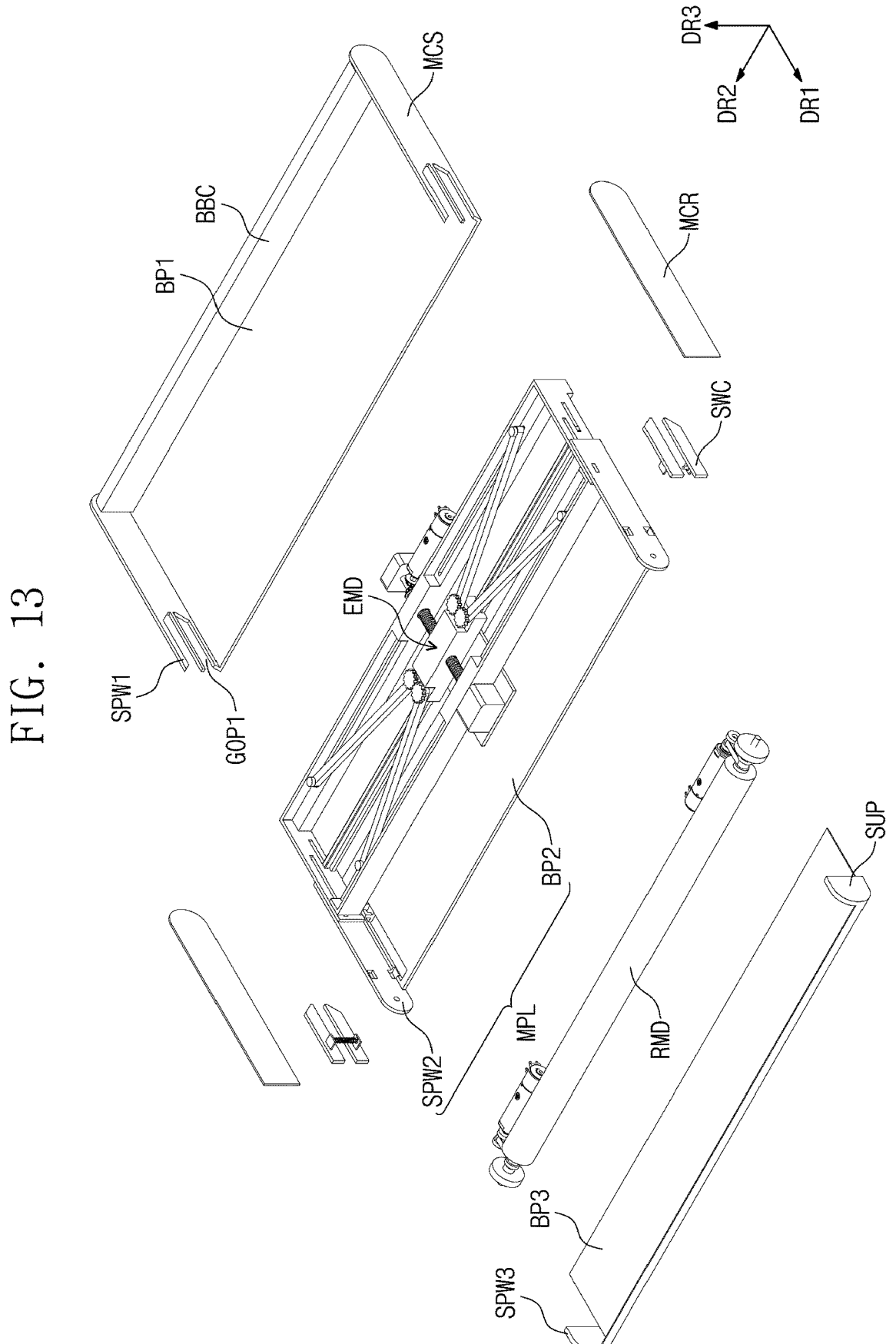
FIG. 13 is a schematic perspective view illustrating a main case, a sub-plate, an extension module, a roller module, main sidewall covers, and sidewall cases illustrated in FIG. 3.

FIG. 13 is a schematic perspective view illustrating the main case, the sub-plate, the extension module, the roller module, the main sidewall covers, and the sidewall cases illustrated in FIG. 3.

For example, the extension module EMD is in the extended mode.

Referring to FIG. 13, the main case MCS may include a first bottom part BP1, first sidewalls SPW1, and a fixed cover BBC. The first bottom part BP1 may have a flat plate shape defined by the first direction DR1 and the second direction DR2.

The fixed cover BBC may be disposed adjacent to a side of both sides of the first bottom part BP1 which are opposite to each other in the first direction DR1 and may extend in the third direction DR3. The side of the first bottom part BP1 may be defined as a side that faces away from an opposite side of the first bottom part BP1 that faces the extension module EMD in the first direction DR1. The fixed cover BBC may extend in the second direction DR2.

A side of the fixed cover BBC may have a planar shape defined by the second direction DR2 and the third direction DR3. The module set RCR illustrated in FIG. 3 may be disposed on the side of the fixed cover BBC. The side of the fixed cover BBC may be defined as a side that faces the extension module EMD.

The first sidewalls SPW1 may extend in the third direction DR3 from opposite sides of the first bottom part BP1 disposed to be opposite each other in the second direction DR2. The first sidewalls SPW1 may face each other in the second direction DR2.

A side of each of the first sidewalls SPW1 in the first direction DR1 may have a curved shape. First guide openings GOP1 may be defined on an opposite side of the first sidewall SPW1 that faces in the first direction DR1. The first guide openings GOP1 may extend in the first direction DR1 from the opposite side toward the side of the first sidewall SPW1. Each of the first guide openings GOP1 may have an inclined shape at an end thereof. The fixed cover BBC may be brought into contact with the first sidewall SPW1 so as to be adjacent to the side of the first sidewall SPW1.

The moving plate MPL may include a second bottom part BP2 and second sidewalls SPW2. The second bottom part BP2 may have a flat plate shape defined by the first direction DR1 and the second direction DR2.

The second sidewalls SPW2 may extend in the third direction DR3 from opposite sides of the second bottom part BP2 disposed to be opposite each other in the second direction DR2. The second sidewalls SPW2 may face each other in the second direction DR2.

A side of each of the second sidewalls SPW2 in the first direction DR1 may have a curved shape. An opposite side of the second sidewall SPW2 in the first direction DR1 may have a straight line shape parallel to the third direction DR3. The opposite side of the second sidewall SPW2 may face the opposite side of the first sidewall SPW1.

The extension module EMD may be coupled to the moving plate MPL. The extension module EMD may be coupled to the second sidewalls SPW2. A coupling relationship between the moving plate MPL and the extension module EMD will be described below.

The extension module EMD and the moving plate MPL may be disposed on the first bottom part BP1. The second bottom part BP2 may be disposed on the first bottom part BP1.

The sub-plate SUP may be disposed under the moving plate MPL. The sub-plate SUP may be disposed on a lower surface of the second bottom part BP2.

The sub-plate SUP may include a third bottom part BP3 and third sidewalls SPW3. A side of the third bottom part BP3 in the first direction DR1 may have a curved shape. The side of the third bottom part BP3 may be defined as an outer side that does not face the side of each of the second sidewalls SPW2.

The third sidewalls SPW3 may extend upward from opposite sides of the third bottom part BP3 disposed to be opposite each other in the second direction DR2. The third sidewalls SPW3 may be adjacent to the side of the third bottom part BP3. The third sidewalls SPW3 may face each other in the second direction DR2.

The roller module RMD and the second sidewalls SPW2 may be disposed between the third sidewalls SPW3 facing each other in the second direction DR2. The roller module RMD may be disposed on the third bottom part BP3.

The third sidewalls SPW3 may be connected to the roller module RMD by the second sidewalls SPW2. A connection relationship between the third sidewalls SPW3, the roller module RMD, and the second sidewalls SPW2 will be described below in detail with reference to FIG. 20B.

The sidewall cases SWC may be disposed in the first guide openings GOP1 defined in the first sidewalls SPW1. The two pairs of sidewall cases SWC may be spaced apart from each other in the second direction DR2 and may be disposed in the first guide openings GOP1.

When viewed in the second direction DR2, a side, which face the first guide openings GOP1, of each of the sidewall cases SWC in the first direction DR1 may have an inclined shape. An opposite side of the sidewall case SWC in the first direction DR1 may have a straight line shape parallel to the third direction DR3. The sidewall cases SWC may have the same shape as the first guide openings GOP1.

The sidewall cases SWC may reciprocate in the first direction DR1 relative to the main case MCS. The sidewall cases SWC may reciprocate in the first direction DR1 along the first guide openings GOP1. The movement of the sidewall cases SWC in the first direction DR1 will be described below in detail with reference to FIGS. 24A to 25B.

The sidewall cases SWC may be coupled to the moving plate MPL. A coupling relationship between the sidewall cases SWC and the moving plate MPL will be described below in detail with reference to FIG. 19.

The main sidewall covers MCR may be coupled to the main case MCS. Each of the main sidewall covers MCR may be coupled to an outside surface of a corresponding one of the first sidewalls SPW1. The outside surfaces of the first sidewalls SPW1 may be defined as surfaces that face away from inside surfaces of the first sidewalls SPW1 that face each other.

Figure 14:
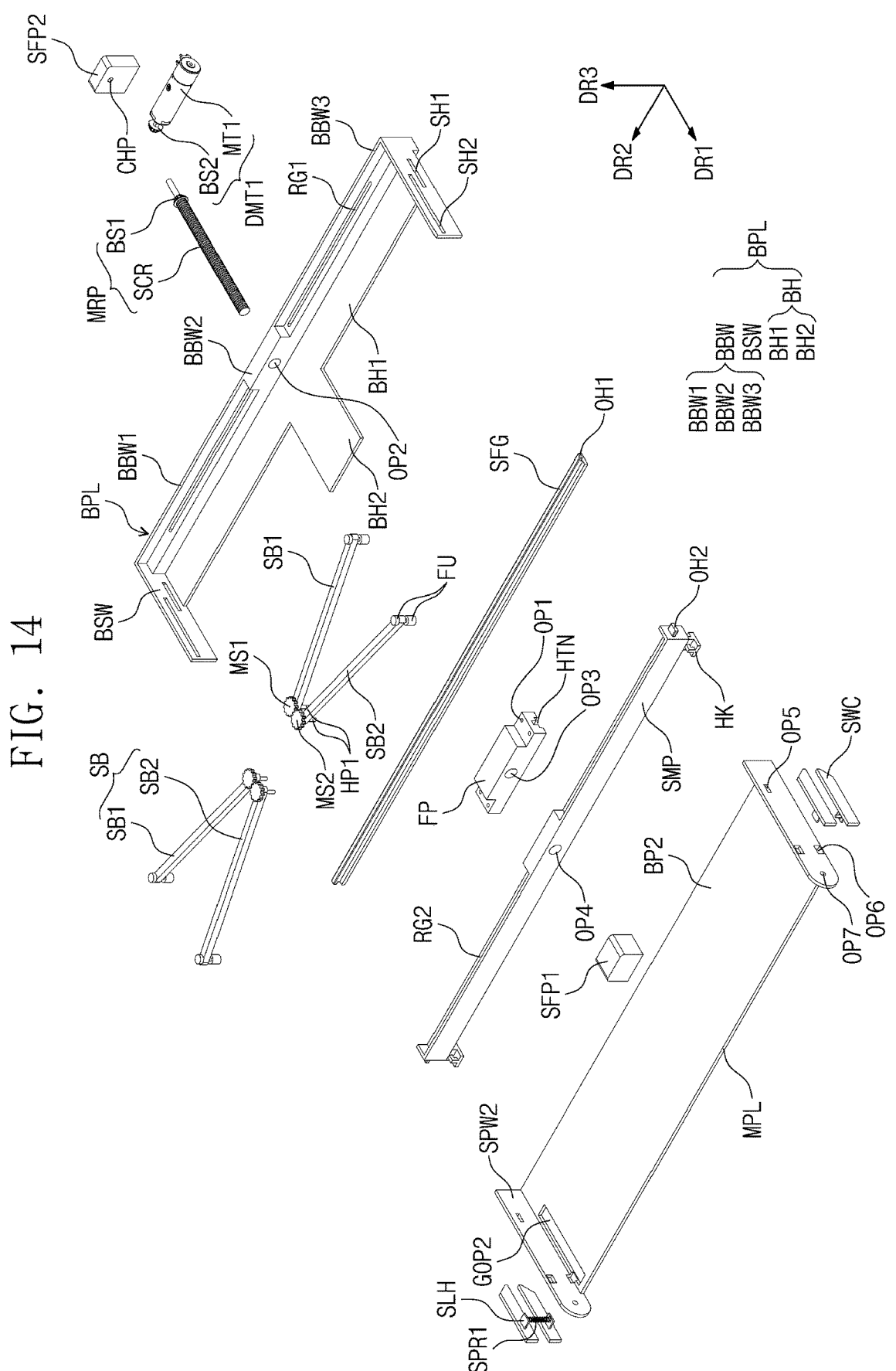
FIG. 14 is a schematic perspective view illustrating the extension module, a moving plate, and the sidewall cases illustrated in FIG. 13.
Figure 15:
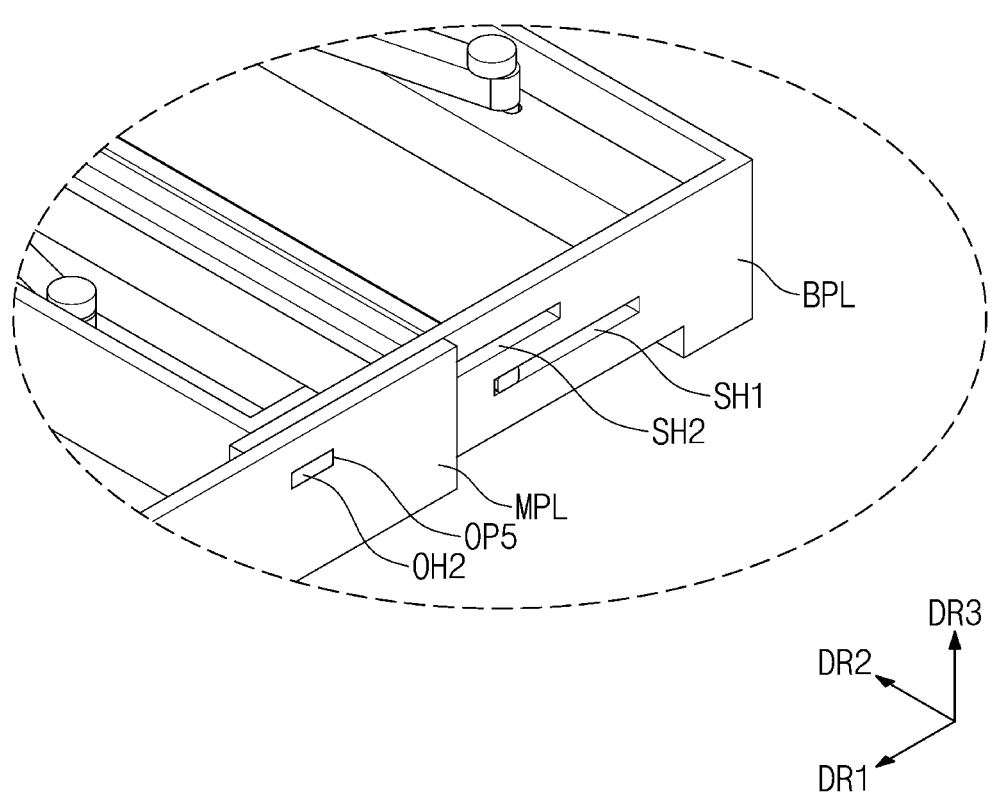
FIG. 15 is an enlarged schematic view illustrating a coupling relationship between a fixed guide, a base plate, a sliding moving bar, and the moving plate illustrated in FIG. 14
Figure 16:
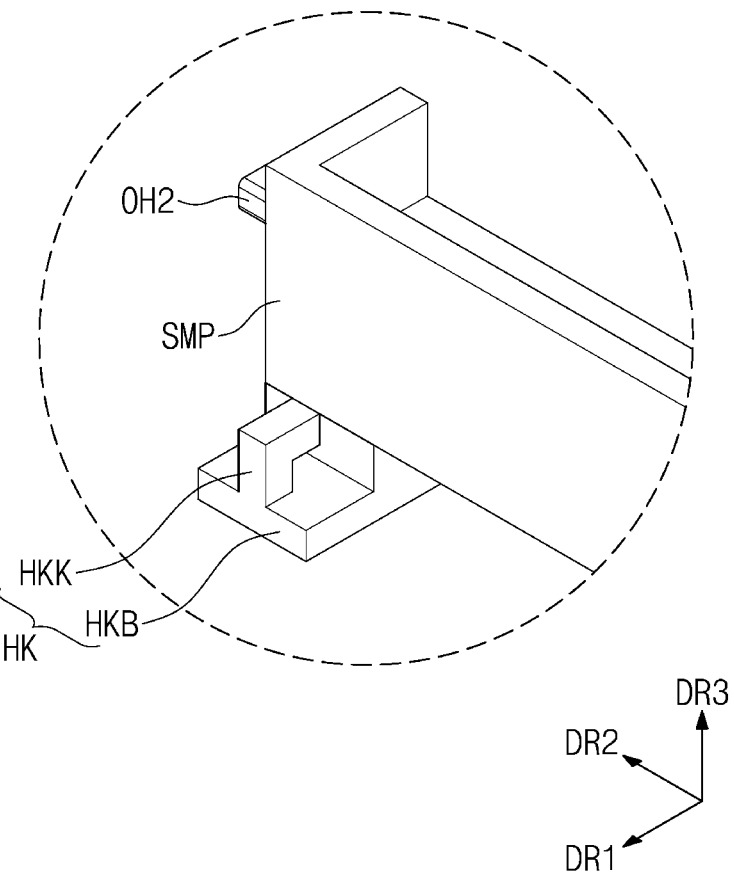
FIG. 16 is an enlarged schematic view illustrating a connecting part illustrated in FIG. 14.
Figure 17:
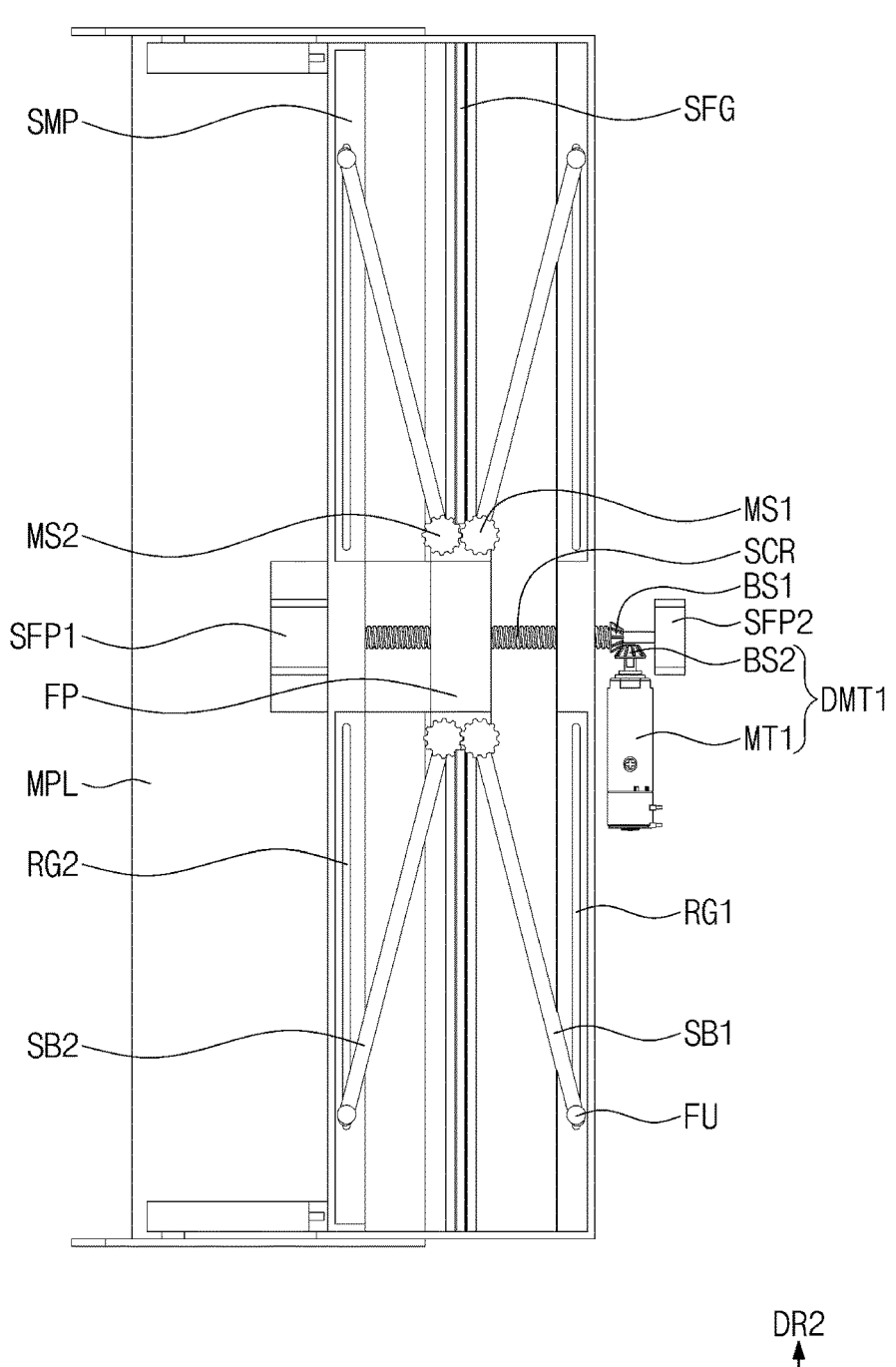
FIG. 17 is an enlarged schematic view illustrating sliding bars illustrated in FIG. 14.
Figure 18:
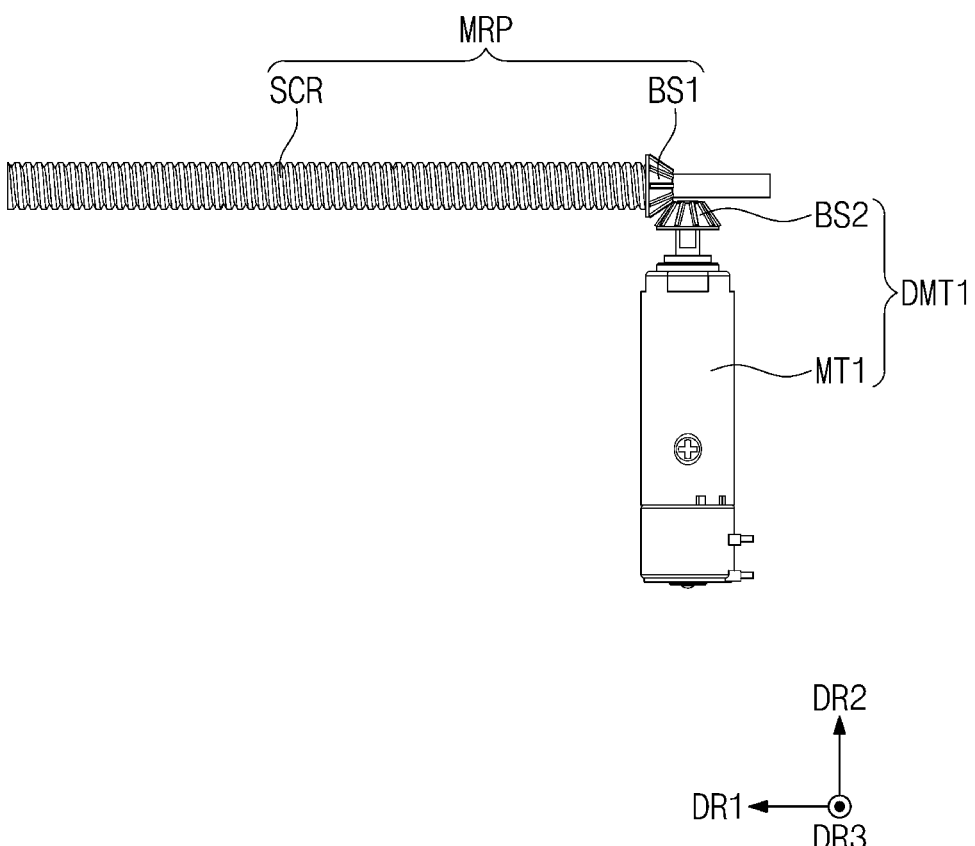
FIG. 18 is a plan view illustrating a center-of-rotation part and a first actuator of FIG. 14.
Figure 19:
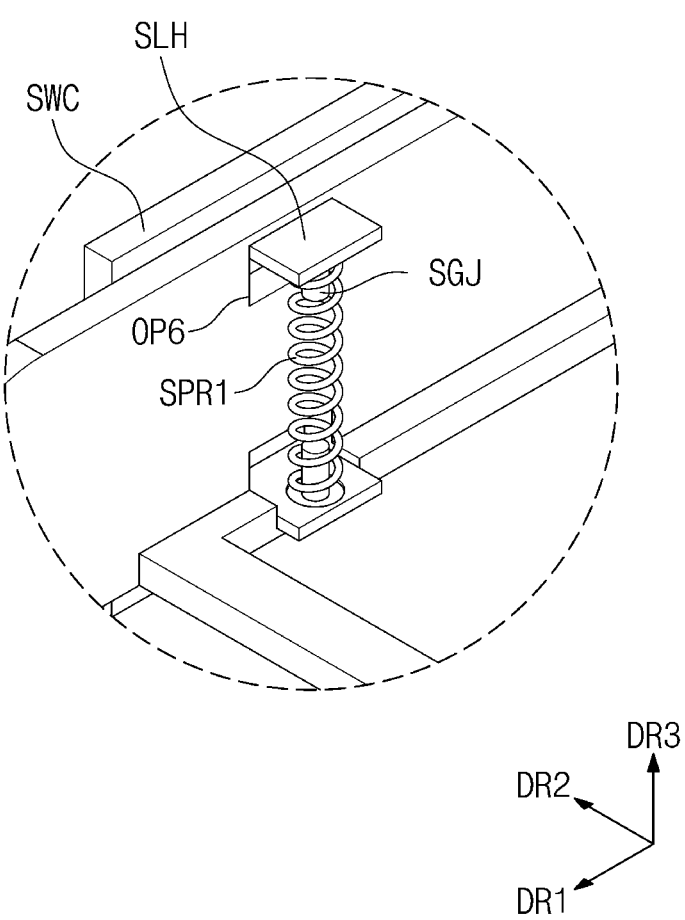
FIG. 19 is a schematic view illustrating the sidewall cases and the moving plate of FIG. 14.

FIG. 14 is a schematic perspective view illustrating the extension module, the moving plate, and the sidewall cases illustrated in FIG. 13. FIG. 15 is an enlarged schematic view illustrating a coupling relationship between a fixed guide, a base plate, a sliding moving bar, and the moving plate illustrated in FIG. 14. FIG. 16 is an enlarged schematic view illustrating a connecting part illustrated in FIG. 14. FIG. 17 is a schematic plan view illustrating sliding bars illustrated in FIG. 14. FIG. 18 is a schematic plan view illustrating a center-of-rotation part and a first actuator of FIG. 14. FIG. 19 is a schematic view illustrating the sidewall cases and the moving plate of FIG. 14.

In FIG. 14, the extension module EMD is illustrated in an exploded state. Furthermore, in FIG. 17, the sliding bars are illustrated in a state of being connected with the base plate BPL and the sliding moving bar SMP.

Referring to FIG. 14, the extension module EMD may include the sliding moving bar SMP, a fixed part FP, the fixed guide SFG, the base plate BPL, the sliding bars SB, the first actuator DMT1, the center-of-rotation part MRP, a first fixed unit SFP1, and a second fixed unit SFP2.

The base plate BPL may include a bottom part BH, a base wall BBW, and base sidewalls BSW.

The bottom part BH may include a first base bottom BH1 and a second base bottom BH2. The first base bottom BH1 may have a flat plate shape defined by the first direction DR1 and the second direction DR2. The first base bottom BH1 may include long sides extending in the second direction DR2 and short sides extending in the first direction DR1.

The second base bottom BH2 may extend in the first direction DR1 from the center of a side of the first base bottom BH1 that faces in the first direction DR1. The second base bottom BH2 may have a flat plate shape defined by the first direction DR1 and the second direction DR2. The first base bottom BH1 and the second base bottom BH2 may form a T-shape in plan view. The side of the first base bottom BH1 may face an opposite side of the third bottom part BP3.

The base wall BBW may be disposed adjacent to an opposite side of the first base bottom BH1. The base wall BBW may extend in the second direction DR2. The base wall BBW may have a quadrilateral shape in plan view.

The base wall BBW may include a first base wall BBW1, a second base wall BBW2, and a third base wall BBW3. The first base wall BBW1, the second base wall BBW2, and the third base wall BBW3 may be arranged in the second direction DR2. The second base wall BBW2 may be disposed between the first base wall BBW1 and the third base wall BBW3. The first base wall BBW1, the second base wall BBW2, and the third base wall BBW3 may have a rectangular shape defined by the first direction DR1 and the second direction DR2 in plan view. However, without being limited thereto, the first base wall BBW1, the second base wall BBW2, and the third base wall BBW3 may have various shapes such as a square shape.

First moving grooves RG1 may be defined on upper surfaces of the first base wall BBW1 and the third base wall BBW3. The first moving grooves RG1 may extend in the second direction DR2. The first moving grooves RG1 may be arranged in the second direction DR2.

The base sidewalls BSW may be disposed on opposite sides of the first base bottom BH1 and the base wall BBW that are opposite each other in the second direction DR2. The base sidewalls BSW may be connected with the first base bottom BH1 and the base wall BBW.

First sliding openings SH1 and second sliding openings SH2 may be defined in the base sidewalls BSW. The second sliding openings SH2 may be disposed above the first sliding openings SH1.

The first sliding openings SH1 and the second sliding openings SH2 may extend in the first direction DR1. The second sliding openings SH2 may be longer in the first direction DR1 than the first sliding openings SH1. The lengths of the first sliding openings SH1 and the second sliding openings SH2 in the first direction DR1 may be greater than the lengths of the first sliding openings SH1 and the second sliding openings SH2 in the third direction DR3.

The fixed part FP may be disposed on the first base bottom BH1. The fixed part FP may be disposed adjacent to the second base wall BBW2.

A coupling opening HTN may be defined on a lower surface of the fixed part FP. Although not illustrated, the coupling opening HTN may extend in the second direction DR2.

First openings OP1 may be defined in an upper surface of the fixed part FP. Two pairs of first openings OP1 may be symmetrical to each other in the second direction DR2. A pair of first openings OP1 may be arranged in the first direction DR1. The other pair of first openings OP1 may be arranged in the first direction DR1.

Referring to FIGS. 14 and 15, the fixed guide SFG may be disposed under the fixed part FP. The fixed guide SFG may be disposed in the coupling opening HTN defined on the lower surface of the fixed part FP. The coupling opening HTN may have the same shape as an outer surface of the fixed guide SFG. The coupling opening HTN and the fixed guide SFG may be connected with each other.

The fixed guide SFG may extend in the second direction DR2. The fixed guide SFG, in plan view, may have a rod shape extending in the second direction DR 2.

The fixed guide SFG may include first sliding protrusions OH1. The first sliding protrusions OH1 may be disposed on opposite sides of the fixed guide SFG disposed to be opposite each other in the second direction DR2. The first sliding protrusions OH1 may extend from the fixed guide SFG in the second direction DR2.

Each of the first sliding protrusions OH1 may be inserted into a corresponding one of the first sliding openings SH1 defined in the base sidewalls BSW. The fixed guide SFG may be connected to the base plate BPL. The fixed part FP may be connected to the base plate BPL by the fixed guide SFG.

The first sliding protrusions OH1 may be shorter in the first direction DR1 than the first sliding openings SH1. The first sliding protrusions OH1 may move in the first direction DR1 along the first sliding openings SH1. The fixed guide SFG may move in the first direction DR1 relative to the base plate BPL. The fixed part FP connected to the fixed guide SFG may move in the first direction DR1 relative to the base plate BPL.

Referring to FIGS. 14, 16, and 17, the sliding moving bar SMP may be disposed on the first base bottom BH1. The sliding moving bar SMP, the fixed part FP, and the base wall BBW may be arranged in the first direction DR1.

The sliding moving bar SMP may extend in the second direction DR2. The sliding moving bar SMP may have a rod shape in plan view.

Second moving grooves RG2 may be defined on an upper surface of the sliding moving bar SMP. The second moving grooves RG2 may extend in the second direction DR2. The second moving grooves RG2 may be arranged in the second direction DR2.

The sliding moving bar SMP may include second sliding protrusions OH2 and connecting parts HK. The second sliding protrusions OH2 may be disposed on opposite sides of the sliding moving bar SMP disposed to be opposite each other in the second direction DR2. The second sliding protrusions OH2 may extend from the sliding moving bar SMP in the second direction DR2.

Each of the second sliding protrusions OH2 may be disposed in a corresponding one of the second sliding openings SH2 defined in the base sidewalls BSW. The sliding moving bar SMP may be connected to the base plate BPL.

The second sliding protrusions OH2 may be shorter in the first direction DR1 than the second sliding openings SH2. The second sliding protrusions OH2 may move in the first direction DR1 along the second sliding openings SH2. Accordingly, the sliding moving bar SMP may move in the first direction DR1 relative to the base plate BPL.

The second sliding protrusions OH2 may be wider in the second direction DR2 than the second sliding openings SH2. Accordingly, portions of the second sliding protrusions OH2 may be exposed to the outside in case that the second sliding protrusions OH2 are disposed in the second sliding openings SH2.

The connecting parts HK may be disposed under regions adjacent to the opposite sides of the sliding moving bar SMP disposed to be opposite each other in the second direction DR2.

Each of the connecting parts HK may include a hook HKK and a connecting body HKB. As illustrated in FIG. 16, the connecting bodies HKB may be disposed under the opposite sides of the sliding moving bar SMP disposed to be opposite each other in the second direction DR2. The hooks HKK may extend from the connecting bodies HKB in the third direction DR3 and the first direction DR1. The hooks HKK, when viewed in the second direction DR2, may have a shape in which an "L" shape is turned upside down.

Referring to FIGS. 14 and 17, the sliding bars SB may be disposed on the base plate BPL, the fixed part FP, and the sliding moving bar SMP.

The sliding bars SB may include first sliding bars SB1 and second sliding bars SB2. The first sliding bars SB1 may be defined as sliding bars SB connected with the base wall BBW. The second sliding bars SB2 may be defined as sliding bars SB connected with the sliding moving bar SMP. Two pairs of sliding bars SB1 and SB2 may be disposed opposite each other in the second direction DR2. A pair of first and second sliding bars SB1 and SB2 may be arranged in the first direction DR1. The other pair of first and second sliding bars SB1 and SB2 may be arranged in the first direction DR1.

Each of the first sliding bars SB1 may include a first protrusion HP1, a first rotational gear MS1, and a sliding unit FU. The first rotational gear MS1 may be disposed on one side of the first sliding bar SB1 that faces in the second direction DR2. The sliding unit FU may be disposed on an opposite side of the first sliding bar SB1 that faces in the second direction DR2. The first protrusion HP1 may be disposed under the first rotational gear MS1. The sides of the first sliding bars SB1 on which the first rotational gears MS1 are disposed may face each other.

Each of the second sliding bars SB2 may include a first protrusion HP1, a second rotational gear MS2, and a sliding unit FU. The second rotational gear MS2 may be disposed on one side of the second sliding bar SB2 that faces in the second direction DR2. The second rotational gears MS2 may be engaged to rotate together with the first rotational gears MS1. The rotational direction of the second rotational gears MS2 may be opposite the rotational direction of the first rotational gears MS1. For example, in case that the first rotational gears MS1 rotate about axes parallel to the third direction DR3 in the clockwise direction, the second rotational gears MS2 engaged with the first rotational gears MS1 may rotate about axes parallel to the third direction DR3 in the counterclockwise direction.

The sliding unit FU may be disposed on an opposite side of the second sliding bar SB2 that faces in the second direction DR2. The first protrusion HP1 may be disposed under the second rotational gear MS2. The sides of the second sliding bars SB2 on which the second rotational gears MS2 are disposed may face each other.

The sliding bars SB may be connected to the fixed part FP, the base plate BPL, and the sliding moving bar SMP. As illustrated in FIG. 14, each of the first protrusions HP1 disposed under the first rotational gears MS1 and the second rotational gears MS2 may be rotatably inserted into a corresponding one of the first openings OP1 defined in the fixed part FP.

Each of the sliding units FU of the first sliding bars SB1 may be disposed in a corresponding one of the first moving grooves RG1 defined on the upper surface of the base plate BPL. The sliding units FU of the first sliding bars SB1 may move in the second direction DR2 along the first moving grooves RG1.

Each of the sliding units FU of the second sliding bars SB2 may be disposed in a corresponding one of the second moving grooves RG2 defined on the upper surface of the sliding moving bar SMP. The sliding units FU of the second sliding bars SB2 may move in the second direction DR2 along the second moving grooves RG2.

Referring to FIGS. 14, 17, and 18, the center-of-rotation part MRP may include a rotational screw SCR and a first main gear BS1. The rotational screw SCR may have a cylindrical shape extending in the first direction DR1. The rotational screw SCR may include crests (reference numeral not shown) and roots (reference numeral not shown). The crests (reference numeral not shown) and the roots (reference numeral not shown) may be disposed on a surface of the rotational screw SCR.

The first main gear BS1 may be disposed adjacent to one side of the rotational screw SCR that faces in the first direction DR1. The first main gear BS1 may be fixed to the rotational screw SCR. In case that the first main gear BS1 rotates about a rotational axis parallel to the first direction DR1, the rotational screw SCR may rotate about the rotational axis parallel to the first direction DR1. The side of the rotational screw SCR may be defined as a side that is opposite the side on which the crests (reference numeral not shown) and the roots (reference numeral not shown) are disposed.

A second opening OP2 extending in the first direction DR1 may be defined in the base wall BBW of the base plate BPL. A third opening OP3 extending in the first direction DR1 may be defined in the center of the fixed part FP. A fourth opening OP4 extending in the first direction DR1 may be defined in the center of the sliding moving bar SMP.

The rotational screw SCR may be disposed in the second opening OP2, the third opening OP3, and the fourth opening OP4. The rotational screw SCR may pass through the second opening OP2, the third opening OP3, and the fourth opening OP4. The base plate BPL, the fixed part FP, and the sliding moving bar SMP may be connected together by the rotational screw SCR.

Although not illustrated, patterns engaged with the crests (reference numeral not shown) and roots (reference numeral not shown) of the rotational screw SCR may be included in the second opening OP2, the third opening OP3, and the fourth opening OP4. Accordingly, in case that the rotational screw SCR rotates about the rotational axis parallel to the first direction DR1, the base plate BPL, the fixed part FP, and the sliding moving bar SMP that have the second opening OP2, the third opening OP3, and the fourth opening OP4 defined therein may move in the first direction DR1.

The first fixed unit SFP1 may be disposed on the second base bottom BH2 of the base plate BPL. The second fixed unit SFP2 may be disposed adjacent to a side of the base wall BBW that faces in the first direction DR1. The side of the base wall BBW may be defined as a side that faces away from an opposite side that faces the fixed part FP. The sliding moving bar SMP, the fixed part FP, the fixed guide SFG, the sliding bars SB, and the base wall BBW may be disposed between the first fixed unit SFP1 and the second fixed unit SFP2. The first fixed unit SFP1, the sliding moving bar SMP, the fixed part FP, the fixed guide SFG, the sliding bars SB, the base wall BBW, and the second fixed unit SFP2 may be arranged in the first direction DR1.

The first fixed unit SFP1 and the second fixed unit SFP2 may have a hexahedral shape. However, without being limited thereto, the first fixed unit SFP1 and the second fixed unit SFP2 may have various shapes.

A fastening portion CHP may be defined in the center of the second fixed unit SFP2. Although not illustrated, a fastening portion (not illustrated) may be defined in the center of the first fixed unit SFP1. The side of the rotational screw SCR may be inserted into the fastening portion CHP. An opposite side of the rotational screw SCR may be inserted into the fastening portion (not illustrated) that is defined in the first fixed unit SFP1. In case that the rotational screw SCR rotates about the rotational axis parallel to the first direction DR1, the first fixed unit SFP1 and the second fixed unit SFP2 may be fixed without moving in the first direction DR1.

The first actuator DMT1 may be disposed between the base plate BPL and the second fixed unit SFP2. The first actuator DMT1 may include a first motor MT1 and a second main gear BS2. The first motor MT1 may have a cylindrical shape. The second main gear BS2 may be disposed on a side of the first motor MT1 that faces in the second direction DR2. The side of the first motor MT1 may be defined as a side adjacent to the side of the rotational screw SCR. The second main gear BS2 may be engaged to rotate together with the first main gear BS1.

Although not illustrated, a line that transmits an electrical signal may be connected to the first motor MT1. In case that the electrical signal is input to the first motor MT1 through the line, the first motor MT1 may rotate the second main gear BS2 about an axis parallel to the second direction DR2. In case that the second main gear BS2 rotates, the first main gear BS1 engaged with the second main gear BS2 may rotate about the rotational axis parallel to the first direction DR1. As the first main gear BS1 rotates, the rotational screw SCR may rotate about the rotational axis parallel to the first direction DR1.

Referring to FIGS. 14 and 15, the moving plate MPL may include the second bottom part BP2 and the second sidewalls SPW2. The second sidewalls SPW2 may extend from the opposite sides of the second bottom part BP2 disposed to be opposite each other in the second direction DR2.

Second guide openings GOP2 may be defined in portions adjacent to the opposite sides of the second bottom part BP2 disposed to be opposite each other in the second direction DR2. The second guide openings GOP2 may extend in the first direction DR1.

A fifth opening OP5, a sixth opening OP6, and a seventh opening OP7 may be defined in each of the second sidewalls SPW2. The sixth openings OP6 may be arranged in the third direction DR3. The fifth openings OP5 and the sixth openings OP6 may have a quadrilateral shape when viewed in the second direction DR2. The seventh openings OP7 may have a circular shape when viewed in the second direction DR2.

The moving plate MPL may be coupled with the extension module EMD. Specifically, portions of the second sliding protrusions OH2 may be exposed to the outside in case that the second sliding protrusions OH2 are disposed in the second sliding openings SH2. Each of the second sliding protrusions OH2 exposed to the outside may be inserted into a corresponding one of the fifth openings OP5 that are opposite each other in the second direction DR2. Accordingly, the moving plate MPL may be connected to the sliding moving bar SMP. Thus, in case that the sliding moving bar SMP moves in the first direction DR1, the second sliding protrusions OH2 may move along the second sliding openings SH2, and the moving plate MPL may move in the first direction DR1.

Referring to FIGS. 14 and 19, each of the sidewall cases SWC may include a sidewall protrusion SLH and an elastic member connecting part SGJ. The sidewall protrusion SLH may be disposed on a side of the sidewall case SWC that faces in the second direction DR2. The sidewall protrusion SLH may extend from the side of the sidewall case SWC in the second direction DR2. The sides of the sidewall cases SWC from which the sidewall protrusions SLH extend may face each other. The elastic member connecting parts SGJ may extend from the sidewall protrusions SLH in the third direction DR3.

Each of the sidewall protrusions SLH may be disposed in a corresponding one of the sixth openings OP6. The thicknesses of the sidewall protrusions SLH in the third direction DR3 may be smaller than the lengths of the sixth openings OP6 in the third direction DR3. Accordingly, the sidewall protrusions SLH may move in the third direction DR3 along the sixth openings OP6.

A first elastic member SPR1 may be disposed between the sidewall protrusions SLH arranged in the third direction DR3. Opposite sides of the first elastic member SPR1 in the third direction DR3 may be mounted on the elastic member connecting parts SGJ. The sidewall cases SWC arranged in the third direction DR3 may be moved toward or away from each other in the third direction DR3 by the first elastic member SPR1.

Figure 20A:
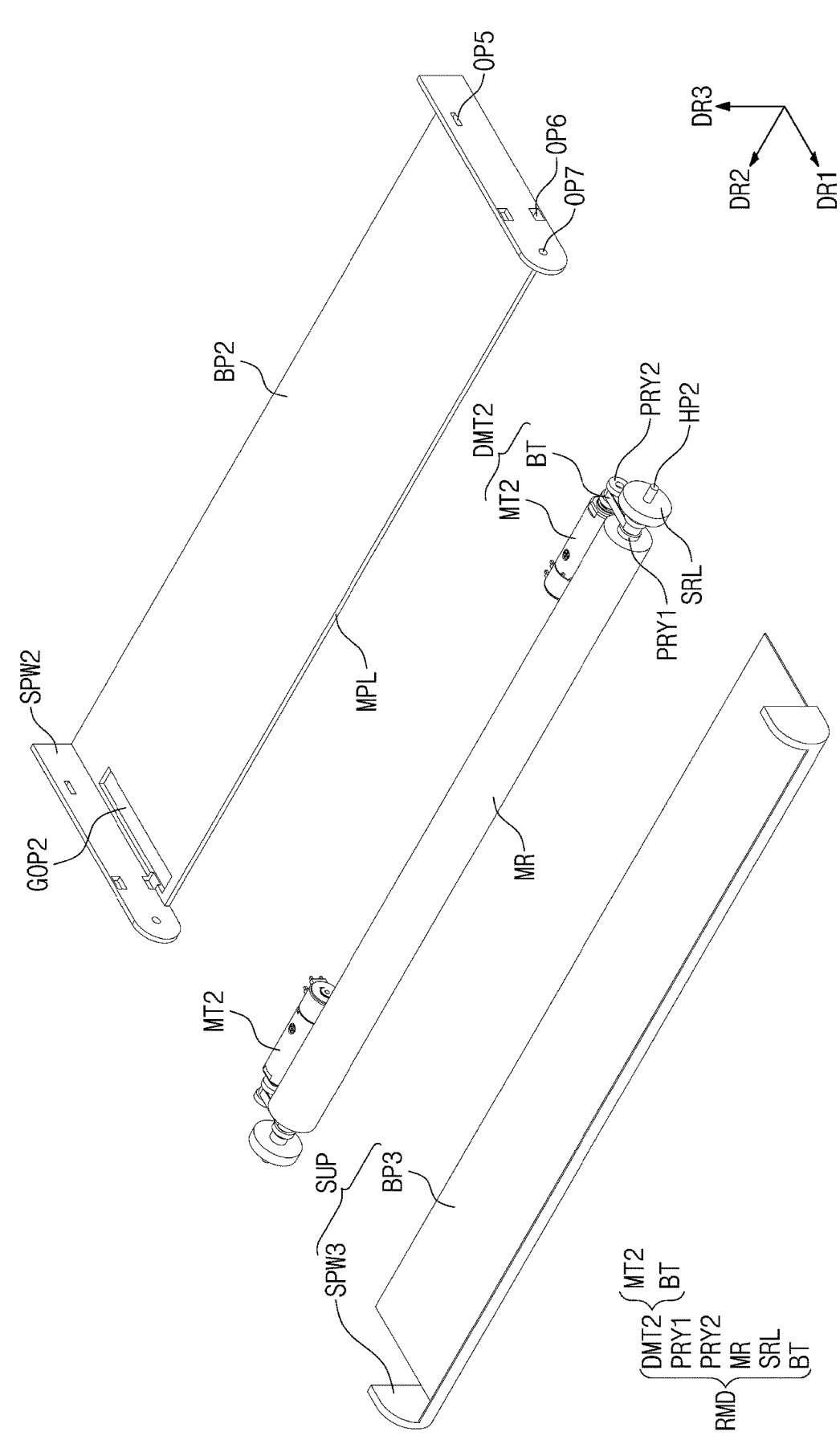
FIG. 20A is a schematic view illustrating the roller module and the sub-plate illustrated in FIG. 13.
Figure 20B:
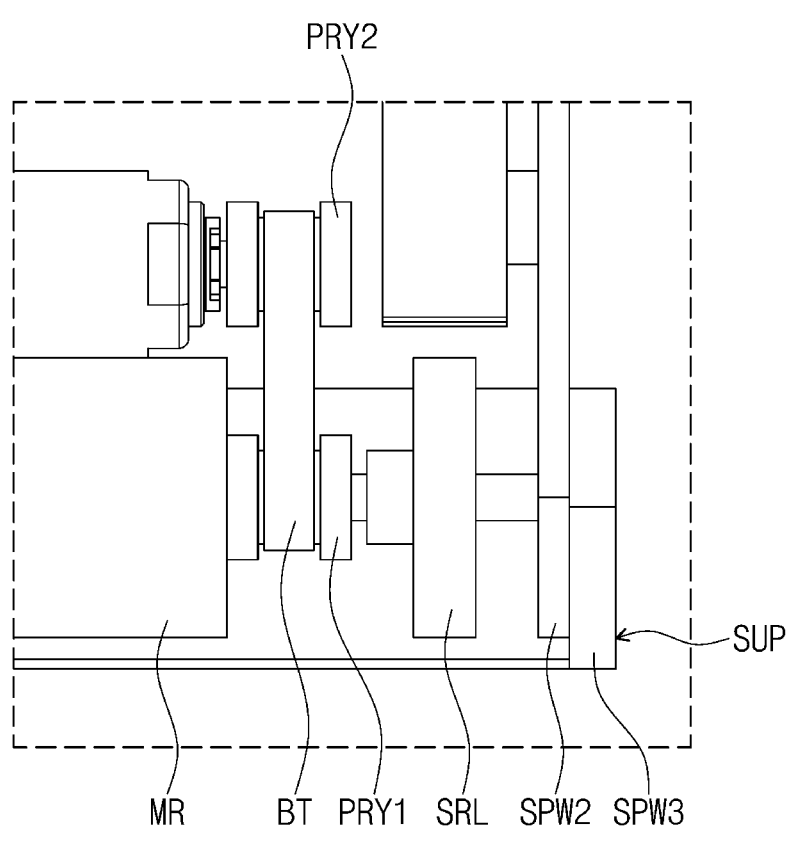
FIG. 20B is a schematic view illustrating a coupled state of the roller module, the sub-plate, and the moving plate.
Figure 20B:
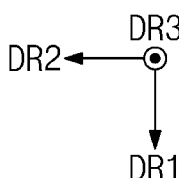

FIG. 20A is a schematic view illustrating the roller module and the sub-plate illustrated in FIG. 13. FIG. 20B is a schematic view illustrating a coupled state of the roller module, the sub-plate, and the moving plate MPL.

FIG. 20B is an enlarged schematic plan view illustrating one side of the roller module RMD that faces in the second direction DR2.

Hereinafter, FIG. 14 will be described together according to the need for explanation.

Referring to FIGS. 14, 20A, and 20B, the roller module RMD may include the main roller MR, sub-rollers SRL, belts BT, first pulleys PRY1, second pulleys PRY2, second protrusions HP2, and second actuators DMT2. The main roller MR may extend in the second direction DR2. The main roller MR may have a cylindrical shape.

The first pulleys PRY1 may be disposed on opposite sides of the main roller MR disposed to be opposite each other in the second direction DR2. The first pulleys PRY1 may have a cylindrical shape. The first pulleys PRY1 may have a smaller radius than the main roller MR.

The sub-rollers SRL may be disposed adjacent to the opposite sides of the main roller MR disposed to be opposite each other in the second direction DR2. The first pulleys PRY1 may be disposed between the sub-rollers SRL and the main roller MR. The sub-rollers SRL may have the same radius as the main roller MR.

The second protrusions HP2 may extend from the sub-rollers SRL in the second direction DR2.

The second actuators DMT2 may be disposed adjacent to the opposite sides of the main roller MR disposed to be opposite each other in the second direction DR2.

Each of the second actuators DMT2 may include a second motor MT2 and the second pulley PRY2. The second motor MT2 may have a cylindrical shape. The second pulley PRY2 may be disposed on a side of the second motor MT2 that faces in the second direction DR2. The side of the second motor MT2 may be defined as a side that faces away from an opposite side of the second motor MT2 that faces the other second motor MT2. The second pulley PRY2 may have a cylindrical shape.

The first pulleys PRY1 and the second pulleys PRY2 may be connected through the belts BT. Although not illustrated, the second pulleys PRY2 connected to the second motors MT2 may rotate about a rotational axis parallel to the second direction DR2 in case that electrical signals are transmitted to the second motors MT2. In case that the second pulleys PRY2 rotate, the first pulleys PRY1 connected with the second pulleys PRY2 through the belts BT may rotate about a rotational axis parallel to the second direction DR2. As the first pulleys PRY1 rotate, the main roller MR and the sub-rollers SRL may rotate about the rotational axis parallel to the second direction DR2.

The roller module RMD may be coupled to the moving plate MPL. The second protrusions HP2 of the roller module RMD may be rotatably coupled to the seventh openings OP7 defined in the second sidewalls SPW2. Accordingly, in case that the moving plate MPL moves in the first direction DR1, the roller module RMD may move in the first direction DR1.

The sub-plate SUP may be disposed under the roller module RMD and the moving plate MPL. The second bottom part BP2 may be disposed on the third bottom part BP3. As illustrated in FIG. 20B, the second sidewall SPW2 may be disposed between the sub-roller SRL and the third sidewall SPW3. The sub-roller SRL, the second sidewall SPW2, and the third sidewall SPW3 may be arranged in the second direction DR2. Although only the right side of the roller module RMD and the second sidewall SPW2 and the third sidewall SPW3 disposed on the right side are illustrated in FIG. 20B, the left side of the roller module RMD and the second sidewall SPW2 and the third sidewall SPW3 disposed on the left side may be substantially the same as the right side of the roller module RMD and the second sidewall SPW2 and the third sidewall SPW3 disposed on the right side.

Figure 21:
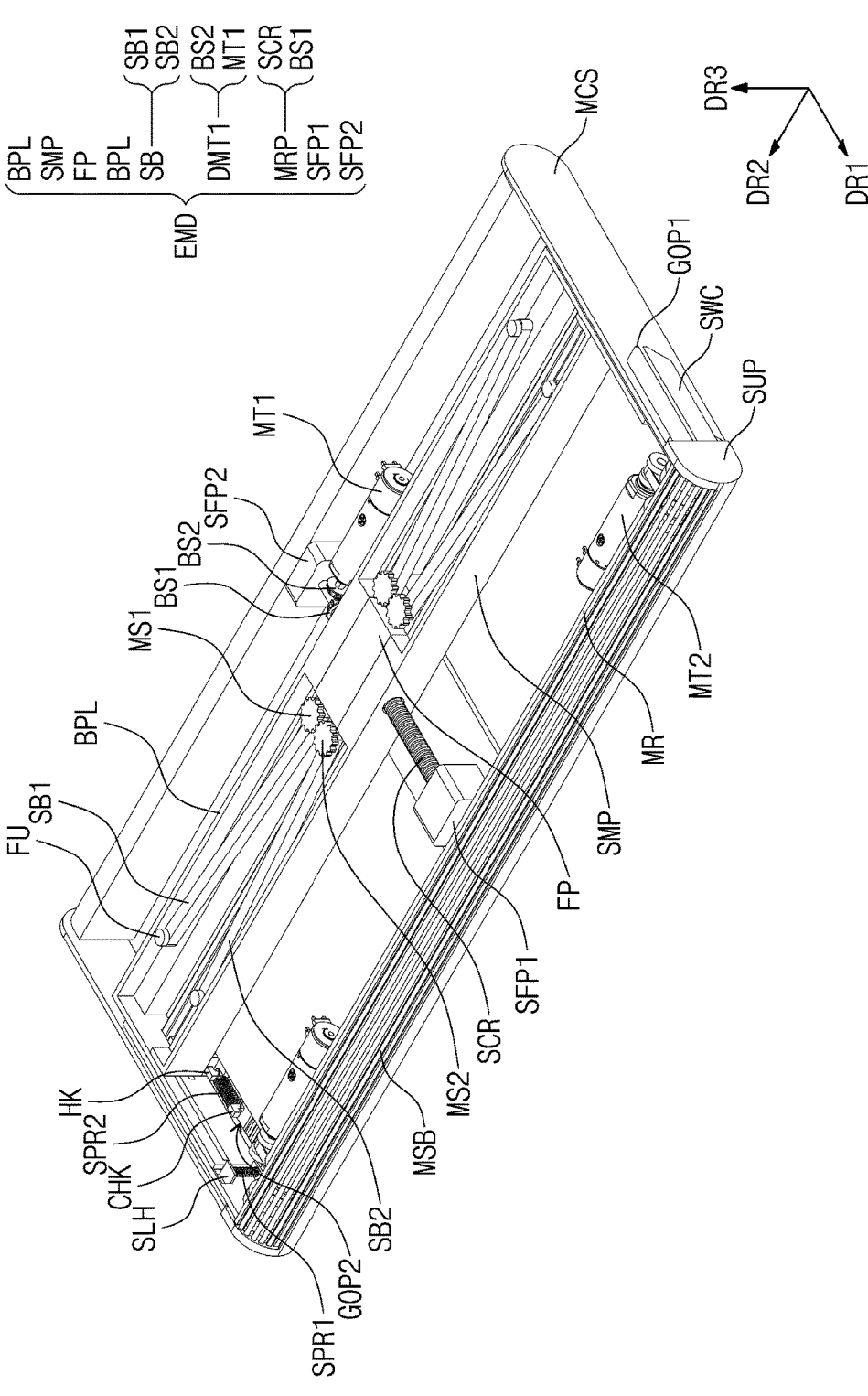
FIG. 21 is a schematic perspective view illustrating the main case, the extension module, the roller module, the moving plate, and the support plate illustrated in FIG. 3.
Figure 22:
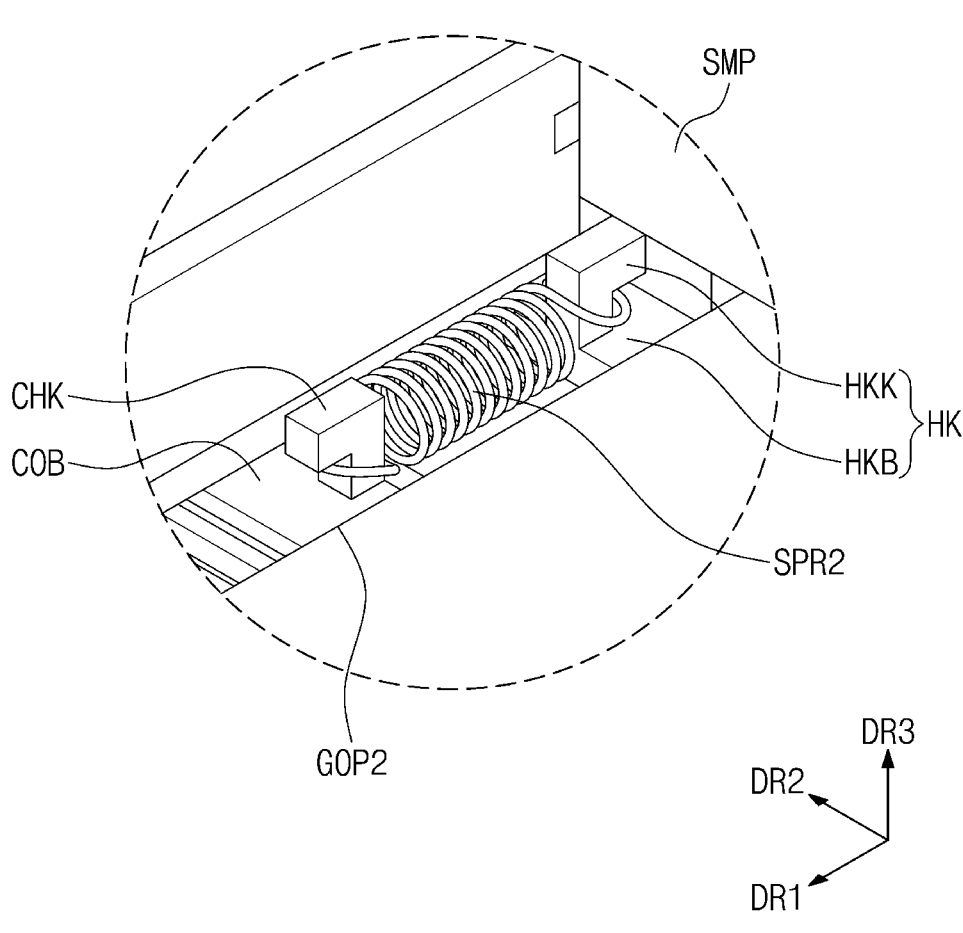
FIG. 22 is an enlarged schematic view illustrating the coupling part and the connecting part of FIG. 21.
Figure 23:
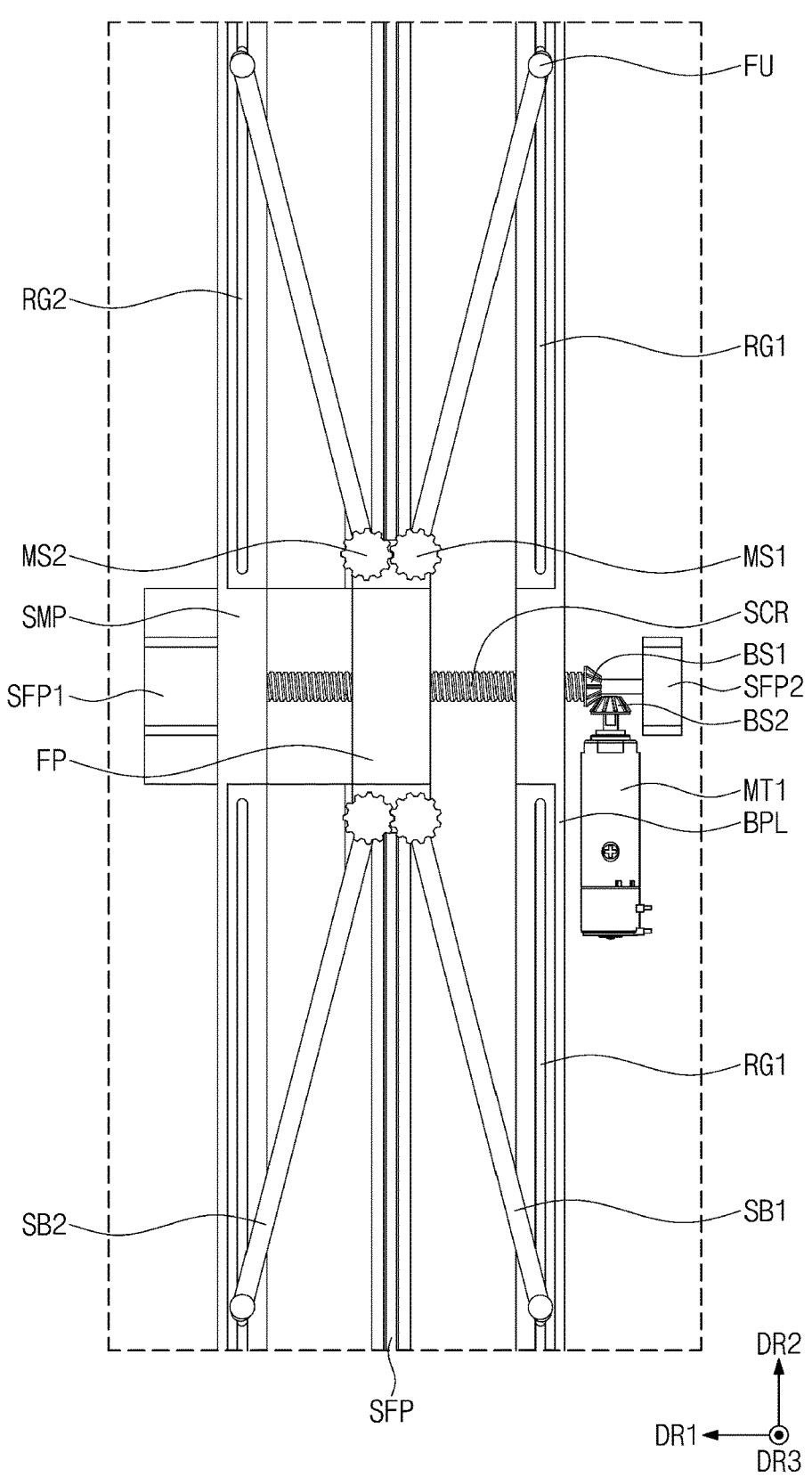
FIG. 23 is an enlarged schematic view illustrating the first actuator, a fixed part, the sliding moving bar, and the center-of-rotation part.
Figure 24:
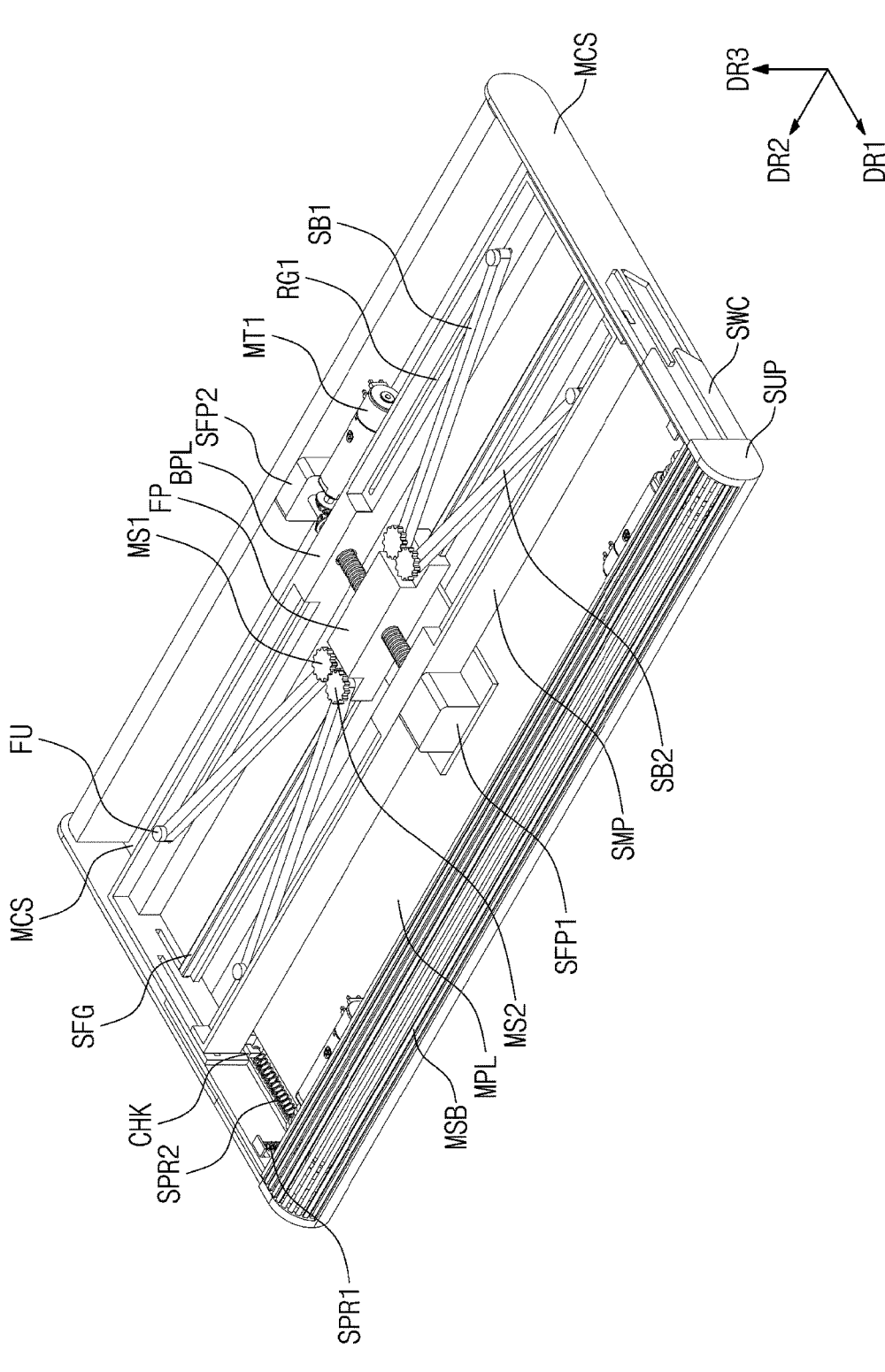
FIG. 24 is a schematic view illustrating the extension module in the extended mode.

FIG. 21 is a schematic perspective view illustrating the main case, the extension module, the roller module, the moving plate, and the support plate illustrated in FIG. 3. FIG. 22 is an enlarged schematic view illustrating the coupling part and the connecting part of FIG. 21. FIG. 23 is an enlarged schematic view illustrating the first actuator, the fixed part FP, the sliding moving bar, and the center-of-rotation part. FIG. 24 is a schematic view illustrating the extension module in the extended mode.

In FIG. 21, the display module DM and the upper plate LTP illustrated in FIG. 4 and the main sidewall covers MCR of FIG. 13 are omitted. FIG. 21 is a view in which the second fixed portion LF2 of the support plate MTP and some of the support bars MSB illustrated in FIG. 9 are omitted and the other support bars MSB are illustrated.

FIG. 21 is a schematic view illustrating the extension module EMD in the reduced mode.

FIG. 22 is an enlarged schematic view illustrating one coupling part and one connecting part among the coupling parts CHK and the connecting parts HK symmetrical in the second direction DR2.

The extension module EMD, the roller module RMD, the moving plate MPL, the sub-plate SUP, the coupling support bar COB, and the main case MCS of FIGS. 21 to 24 may be identical to the extension module EMD, the roller module RMD, the moving plate MPL, the sub-plate SUP, the coupling support bar COB, and the main case MCS of FIGS. 3 to 20B and therefore will be omitted from the description or will be briefly described.

Referring to FIGS. 21 and 22, the support bars MSB may be arranged in the first direction DR1 from the plate PLA of FIG. 9. Some of the support bars MSB may be disposed between the moving plate MPL and the sub-plate SUP. The other support bars MSB may be arranged in a curved shape along the outer surface of the main roller MR and the outer surfaces of the sub-rollers SRL. The coupling support bar COB illustrated in FIG. 10 may be arranged in the first direction DR1 between the moving plate MPL and the sub-plate SUP.

A side of the sub-plate SUP that has a curved shape may cover the support bars MSB disposed on the outer surface of the main roller MR.

Each of the coupling parts CHK disposed on the coupling support bar COB may be inserted into a corresponding one of the second guide openings GOP2 defined in the second bottom part BP2. Accordingly, the support bars MSB may be coupled to the moving plate MPL.

The coupling parts CHK may move in the first direction DR1 along the second guide openings GOP2. As the coupling support bar COB move in the first direction DR1, the coupling parts CHK coupled to the second bottom part BP2 may move in the first direction DR1 along the second guide openings GOP2.

The extension module EMD may further include a second elastic member SPR2. The coupling part CHK may be connected with the connecting part HK through the second elastic member SPR2. The second elastic member SPR2 may provide an elastic force in a direction opposite to a direction of movement of the coupling part CHK. The coupling part CHK may receive an elastic force in the direction opposite to the direction of movement by the elastic force of the second elastic member SPR2. Accordingly, the support bars MSB may remain in a flat state.

In a case in which the support plate MTP is not maintained in a flat state in case that the display device DD illustrated in FIGS. 1 and 2 is changed from the reduced mode to the extended mode, the extension region DEP of the display module DM illustrated in FIG. 4 may be wrinkled.

However, according to an embodiment of the disclosure, the support plate MTP may receive an elastic force from the second elastic member SPR2. Accordingly, the support bars MSB may be maintained in a flat state, and the display panel DP may be prevented from being wrinkled. Thus, the surface quality of the display module DM may be increased in the extended mode.

Referring to FIGS. 21, 23, and 24, in case that the first motor MT1 receives an electrical signal, the first main gear BS1 may rotate about a rotational axis parallel to the second direction DR2. In case that the second main gear BS2 rotates, the first main gear BS1 engaged with the second main gear BS2 may rotate about a rotational axis parallel to the first direction DR1. In case that the first main gear BS1 rotates, the rotational screw SCR may rotate about a rotational axis parallel to the first direction DR1. In case that the rotational screw SCR rotates, the fixed part FP and the sliding moving bar SMP connected to the rotational screw SCR may be moved in the first direction DR1 by the crests (reference numeral not shown) and the roots (reference numeral not shown) of the rotational screw SCR. The fixed part FP and the sliding moving bar SMP may move in the first direction DR1 toward the first fixed unit SFP1. Accordingly, the base wall BBW, the fixed part FP, and the sliding moving bar SMP may be spaced apart from each other in the first direction DR1. As the sliding moving bar SMP moves in the first direction DR1, the moving plate MPL connected to the sliding moving bar SMP may move in the first direction DR1. As the moving plate MPL moves in the first direction DR1, the roller module RMD and the sub-plate SUP connected to the moving plate MPL may move in the first direction DR1.

Although not illustrated, the second actuators DMT2 of the roller module RMD may be electrically connected with the first actuator DMT1. In case that the first motor MT1 rotates about a rotational axis parallel to the second direction DR2, the second motors MT2 may also simultaneously rotate about a rotational axis parallel to the second directions DR2. In case that the second motors MT2 rotate, the main roller MR and the sub-rollers SRL connected by the second motors MT2 and the belts BT may rotate about a rotational axis parallel to the second direction DR2. Accordingly, the support bars MSB disposed between the sub-plate SUP and the moving plate MPL and the support bars MSB disposed on the outer surface of the main roller MR and the outer surfaces of the sub-rollers SRL may be exposed to the outside along the outer surface of the main roller MR and the outer surfaces of the sub-rollers SRL. Thus, the area of the support plate MTP exposed to the outside may be increased.

As the area of the support plate MTP exposed to the outside is increased, the area by which the display panel DP coupled to the support plate MTP is exposed to the outside may be increased as illustrated in FIG. 3. As illustrated in FIGS. 5A and 5B, the extension region DEP and the fixed region DFP may be arranged in the first direction DR1.

In case that the fixed part FP and the sliding moving bar SMP move in the first direction DR1, each of the first sliding bars SB1 may rotate about an axis parallel to the third direction DR3 on the plane defined by the first direction DR1 and the second direction DR2. In case that the first sliding bar SB1 rotates, the first rotational gear MS1 on the one side of the first sliding bar SB1 in the second direction DR2 may rotate about an axis parallel to the third direction DR3. The sliding unit FU on the opposite side of the first sliding bar SB1 in the second direction DR2 may move in the second direction DR2 along the first moving groove RG1.

In case that the first rotational gear MS1 rotates, the second rotational gear MS2 on the one side of the second sliding bar SB2 in the second direction DR2 may be engaged with the first rotational gear MS1 and may rotate about an axis parallel to the third direction DR3. The first rotational gear MS1 and the second rotational gear MS2 may rotate in opposite directions. As the second rotational gear MS2 rotates, the second sliding bar SB2 may rotate about an axis parallel to the third direction DR3 on the plane defined by the first direction DR1 and the second direction DR2. The sliding unit FU on the opposite side of the second sliding bar SB2 in the second direction DR2 may move in the second direction DR2 along the second moving groove RG2. The opposite sides of the first sliding bars SB1 and the opposite sides of the second sliding bars SB2 may be spaced apart from each other in the first direction DR1.

In case that the second sliding bars SB2 rotate, the second sliding bars SB2 may apply a force parallel to the first direction DR1 to the opposite sides of the sliding moving bar SMP disposed to be opposite each other in the second direction DR2. Accordingly, the opposite sides of the sliding moving bar SMP disposed to be opposite each other in the second direction DR2 may move in the first direction DR1 at the same speed.

The extension module EMD and the moving plate MPL may be changed to the extended mode and the reduced mode even without the first sliding bars SB1 and the second sliding bars SB2. Furthermore, the extension module EMD may include first actuators DMT1. However, the opposite sides of the sliding moving bar SMP disposed to be opposite each other in the second direction DR2 may move in the first direction DR1 at different speeds due to a dimensional error between parts and an electrical error between the first actuators DMT1. Therefore, the display module DM may be wrinkled in case that the display device DD illustrated in FIGS. 1 and 2 is changed to the extended mode.

However, since the display device DD according to an embodiment of the disclosure includes one first actuator DMT1, an electrical error between actuators may be reduced. Furthermore, since one rotational screw SCR rotates, the opposite sides of the fixed part FP in the second direction DR2, the opposite sides of the sliding moving bar SMP in the second direction DR2, and the opposite sides of the moving plate MPL in the second direction DR2 may move in the first direction DR1 at the same speed. Due to the first sliding bars SB1 and the second sliding bars SB2, the opposite sides of the sliding moving bar SMP in the second direction DR2 and the opposite sides of the moving plate MPL in the second direction DR2 may move in the first direction DR1 at the same speed. Accordingly, the extension region DEP of the display module DM may be prevented from being wrinkled in case that the display device DD illustrated in FIGS. 1 and 2 is changed to the extended mode. Thus, the surface quality of the display module DM may be increased.

Figure 25A:
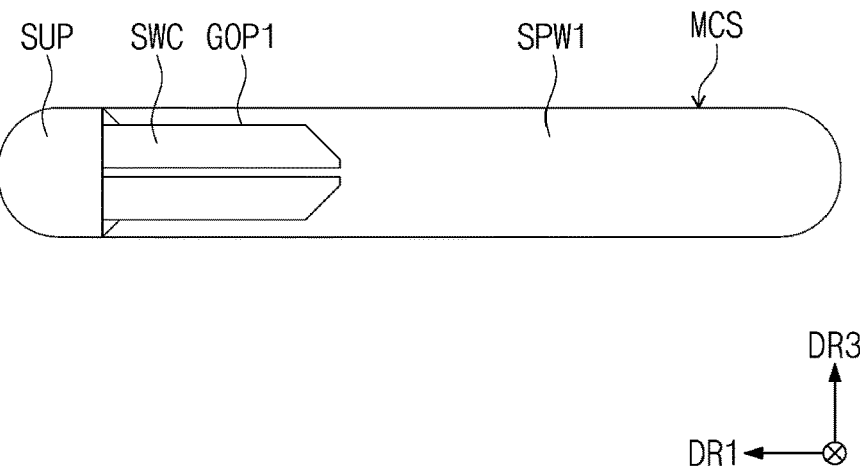
FIGS. 25A and 25B are schematic views illustrating the sidewall cases in the reduced mode.
Figure 25B:
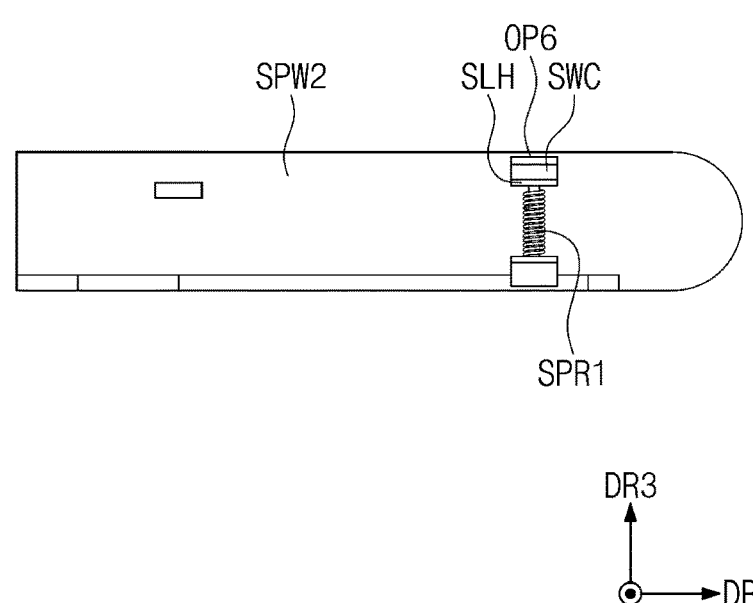
Figure 26A:
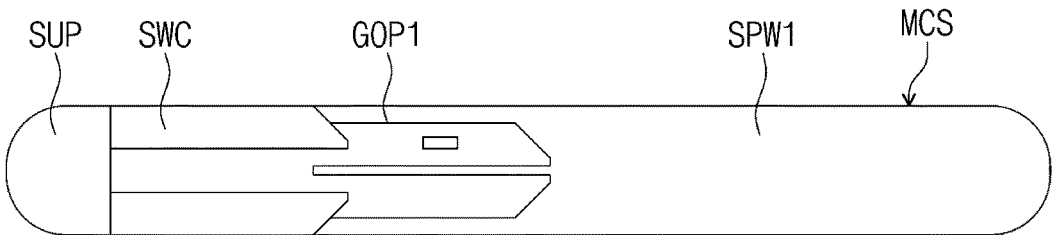
FIGS. 26A and 26B are schematic views illustrating the sidewall cases in the extended mode.
Figure 26A:
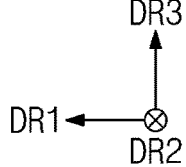
Figure 26B:
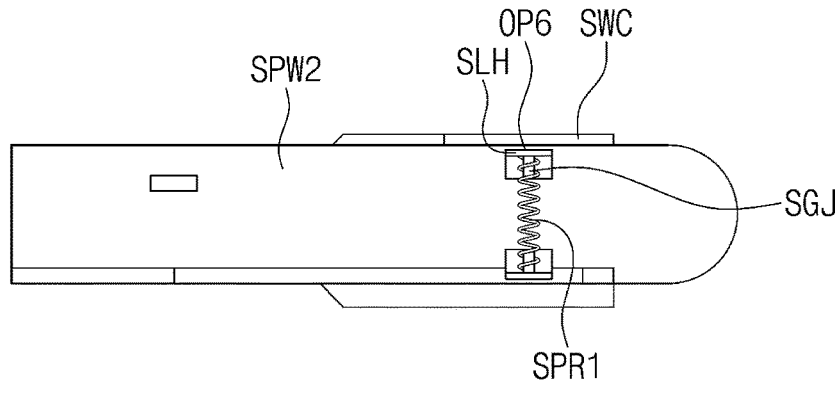
Figure 26B:
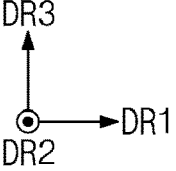

FIGS. 25A and 25B are schematic views illustrating the sidewall cases in the reduced mode. FIGS. 26A and 26B are schematic views illustrating the sidewall cases in the extended mode.

The sidewall cases SWC disposed to be opposite each other in the second direction DR2 have substantially the same configuration, and therefore one pair of sidewall cases SWC will hereinafter be described with reference to FIGS. 25A to 26B.

For convenience of description, the main sidewall covers MCR and the roller module RMD are omitted in FIGS. 25A to 26B.

The sidewall cases SWC, the first elastic member SPR1, and the moving plate MPL may be identical to the sidewall cases SWC, the first elastic member SPR1, and the moving plate MPL of FIGS. 14 and 18 and therefore will be omitted from the description or will be briefly described.

Referring to FIGS. 25A and 25B, the sidewall cases SWC may be disposed in the first guide openings GOP1 defined in the main case MCS. The sidewall cases SWC may be disposed between opposite sides of the first sidewall SPW1 disposed to be opposite each other in the third direction DR3. The sidewall protrusions SLH of the sidewall cases SWC may be inserted into the sixth openings OP6 defined in the second sidewall SPW2 of the moving plate MPL. The first elastic member SPR1 may be disposed between the sidewall protrusions SLH facing each other in the third direction DR3. In the reduced mode, the first elastic member SPR1 may be compressed.

Referring to FIGS. 26A and 26B, in case that the display device DD of FIGS. 1 and 2 is changed from the reduced mode to the extended mode, the sidewall cases SWC may move in the first direction DR1 along the first guide openings GOP1. The sidewall cases SWC exposed from the first guide openings GOP1 to the outside may be moved in the third direction DR3 by the elastic force of the first elastic member SPR1. The sidewall cases SWC may be further spaced apart from each other in the third direction DR3 in the extended mode than in the reduced mode. The upper surfaces of the sidewall cases SWC and the first sidewall SPW1 may be disposed at the same height. The sidewall cases SWC and the first sidewall SPW1 may be arranged in the first direction DR1. The one side of the sidewall case SWC in the first direction DR1 may be brought into contact with the opposite side of the first sidewall SPW1. In case that the display device DD is changed from the extended mode to the reduced mode, the sidewall cases SWC may move in the third direction DR3 and the first direction DR1 along the opposite side of the first sidewall SPW1 and may be disposed in the first guide openings GOP1.

In a case in which the sidewall cases SWC move away from each other in the third direction DR3 in case that the display device DD of FIGS. 1 and 2 is changed to the extended mode, portions of the opposite sides of the display module DM of FIGS. 1 and 2 that are opposite each other in the second direction DR2 may be exposed to the outside. In case that an external impact is applied to the display module DM, the display module DM is likely to be damaged.

However, according to an embodiment of the disclosure, in case that the display device DD is changed to the extended mode, the sidewall cases SWC may be moved in the third direction DR3 by the first elastic member SPR1. Accordingly, the sidewall cases SWC may cover exposed portions of the opposite sides of the display module DM disposed to be opposite each other in the second direction DR2. Thus, even though an external impact is applied to the display module DM, a risk of damage to the display module DM may be reduced.

According to the embodiments of the disclosure, the sliding bars and the rotating rod of the extension module may allow the opposite sides of the moving plate opposite each other in the second direction to move at the same speed in case that the display device is extended. Furthermore, the hook of the extension module may be connected to the coupling part disposed on the support plate and may pull the extension region of the support plate in the direction opposite to the direction of movement of the support plate. Accordingly, the display panel may be prevented from being wrinkled in case that the display device is changed to the extended mode. Thus, the surface quality of the display panel may be improved, and the support plate may be extended in a flat state.

In case that the display device is extended, the sidewall cases may move in the third direction and may be disposed on the opposite sides of the display panel disposed to be opposite each other in the second direction. Accordingly, portions of the side surfaces of the display panel may not be exposed to the outside. Thus, the sidewall cases may cover the side surfaces of the display panel, and even though an external impact is applied to the extension of the display panel, damage to the display panel may be prevented by the sidewall cases.

While the disclosure has been described with reference to embodiments thereof, it will be apparent to those of ordinary skill in the art that various changes and modifications may be made thereto without departing from the spirit and scope of the disclosure.

What is claimed is:
1. A display device comprising:
a display module;
an extension module that is disposed under the display module and that extends and retracts in a first direction;

a main case that accommodates the extension module, the main case having sides opposite each other in a second direction intersecting the first direction; and
a pair of sidewall cases that are spaced apart from each other in a third direction intersecting a plane defined by the first and second directions, each sidewall case moves in the first direction and in the third direction relative to the main case.
2. The display device of claim 1, wherein
the display device has a reduced mode in which the display module is retracted into the main case and an extended mode in which the display module is extended outside the main case, and
the pair of sidewall cases are farther away from each other in the third direction in the extended mode than in the reduced mode.
3. The display device of claim 1, further comprising:
a first elastic member that is disposed between the pair of sidewall cases, the first elastic member moves the pair of sidewall cases away from each other in the third direction.
4. The display device of claim 1, wherein the pair of sidewall cases move in the first direction along first guide openings defined on one of the sides of the main case.
5. The display device of claim 1, further comprising:
a support plate disposed under the display module, the support plate including a plate and a plurality of support bars disposed in the first direction together with the plate; and
a moving plate disposed in the main case and coupled to the extension module and the plurality of support bars, wherein
the moving plate is coupled to slide in the first direction relative to the extension module, and
a coupling support bar defined as a support bar furthest from the plate among the plurality of support bars is coupled to the moving plate to slide in the first direction.
6. The display device of claim 5, wherein
the main case includes:
a first bottom part including a flat plate shape defined by the first and second directions; and
first sidewalls that extend upward from opposite sides of the first bottom part disposed to be opposite each other in the second direction, the first sidewalls including first guide openings defined therein, and
the pair of sidewall cases move in the first direction in the first guide openings that extend in the first direction.
7. The display device of claim 6, wherein
the moving plate includes:
a second bottom part including a flat plate shape defined by the first and second directions, the second bottom part being disposed on the first bottom part and including a plurality of second guide openings that extend in the first direction; and
second sidewalls that extend upward from opposite sides of the second bottom part disposed to be opposite each other in the second direction, and
the coupling support bar is coupled to the second bottom part and moves in the first direction along the plurality of second guide openings.
8. The display device of claim 7, wherein
the support plate further includes a plurality of coupling parts that couple the coupling support bar to the second bottom part, and
the plurality of coupling parts extend from the coupling support bar and move in the first direction along the plurality of second guide openings in a state of being inserted into the plurality of second guide openings.

9. The display device of claim 8, wherein the extension module includes:

a plurality of connecting parts disposed in the second direction; and a plurality of second elastic members that connect the plurality of coupling parts and the plurality of connecting parts.

10. The display device of claim 1, wherein the extension module includes:

a base plate including a bottom part and base sidewalls that extend upward from opposite sides of the bottom part disposed to be opposite each other in the second direction, the base sidewalls include a plurality of first sliding openings that extend in the first direction and a plurality of second sliding openings disposed above the plurality of first sliding openings and that extend in the first direction;

a fixed guide disposed in the plurality of first sliding openings and connected with the base plate;

a fixed part disposed on the fixed guide;

a sliding moving bar disposed in the second sliding openings and connected with the base plate;

a center-of-rotation part that connects the base plate, the fixed part, and the sliding moving bar; and a first actuator connected with the center-of-rotation part, and the center-of-rotation part is rotated about a rotational axis parallel to the first direction in case that the first actuator rotates about a rotational axis parallel to the second direction.

11. The display device of claim 10, wherein the center-of-rotation part includes:

a rotational screw that extends in the first direction; and a first main gear disposed on a side of the rotational screw facing in the first direction, the first actuator includes:

a first motor; and a second main gear disposed on a side of the first motor facing in the second direction, and the first main gear and the second main gear are engaged with each other to rotate.

12. The display device of claim 11, further comprising:

a moving plate coupled to the extension module, wherein in case that the center-of-rotation part rotates, the base plate, the fixed part, and the moving plate move in the first direction and are spaced apart from each other.

13. The display device of claim 12, wherein the extension module further includes:

a plurality of first sliding bars connected to the fixed part and the base plate; and a plurality of second sliding bars connected to the fixed part and the sliding moving bar, first sides of the plurality of first sliding bars and first sides of the plurality of second sliding bars coupled to the fixed part are engaged with each other to rotate, and second sides of the plurality of first sliding bars are coupled to the base plate to slide, and second sides of the plurality of second sliding bars are coupled to the sliding moving bar to slide.

14. The display device of claim 1, further comprising:

a support plate disposed under the display module, the support plate including a plate and a plurality of support bars disposed in the first direction together with the plate;

a moving plate coupled to the extension module, the moving plate including a second bottom part and second sidewalls that extends upward from opposite sides of the second bottom part disposed to be opposite each other in the second direction; and a main roller coupled to the second sidewalls of the moving plate disposed to be opposite each other in the second direction, wherein some of the plurality of support bars are disposed on an outer surface of the main roller.

15. The display device of claim 14, further comprising:

a second actuator that rotates the main roller about a rotational axis that extends in the second direction.

16. The display device of claim 15, further comprising:

a sub-plate disposed under the moving plate, wherein some of the plurality of support bars are disposed between the moving plate and the sub-plate.

17. The display device of claim 16, wherein the plurality of support bars are disposed in a curved shape along the outer surface of the main roller after disposed in the first direction from the support plate and are disposed in the first direction between the moving plate and the sub-plate.

18. The display device of claim 17, wherein the sub-plate is disposed to cover the plurality of support bars disposed on the outer surface of the main roller.

19. A display device comprising:

a display module;

a support plate that is disposed under the display module and that includes:

a plate;

a plurality of support bars disposed in a first direction together with the plate; and a plurality of coupling parts that extend from a coupling support bar furthest from the plate among the plurality of support bars;

an extension module that is disposed under the plate and that extends and retracts in the first direction;

a main case that accommodates the extension module, the main case having sides opposite each other in a second direction intersecting the first direction;

a moving plate disposed in the main case and coupled to the extension module and the plurality of support bars; and a pair of sidewall cases spaced apart from each other in a third direction intersecting a plane defined by the first and second directions, each sidewall case moves in the first and the third directions relative to the main case, wherein the plurality of coupling parts are inserted into guide openings defined in the moving plate and move along the guide openings, the extension module includes:

a plurality of connecting parts spaced apart from each other in the second direction; and a plurality of elastic members disposed between the plurality of connecting parts and the plurality of coupling parts and connected to the plurality of connecting parts and the plurality of coupling parts.

20. A display device comprising:

a display module;

an extension module that is disposed under the display module and that extends and retracts in a first direction;

a main case that accommodates the extension module;

two pairs of sidewall cases, each pair of sidewall cases disposed on opposite sides of the main case opposite each other in a second direction intersecting the first direction, each sidewall case within a pair of sidewall cases disposed spaced apart from each other in a third direction intersecting a plane defined by the first and second directions; and a plurality of first elastic members disposed between each pair of sidewall cases disposed in the third direction.

21. An electronic device for providing an image comprising:

a display device comprising:

a display module;

an extension module that is disposed under the display module and that extends and retracts in a first direction;

a main case that accommodates the extension module, the main case having sides opposite each other in a second direction intersecting the first direction; and a pair of sidewall cases that are spaced apart from each other in a third direction intersecting a plane defined by the first and second directions, each sidewall case moves in the first direction and in the third direction relative to the main case.

* * * * *